(12) United States Patent
Judge et al.

(10) Patent No.: US 8,578,480 B2
(45) Date of Patent: Nov. 5, 2013

(54) SYSTEMS AND METHODS FOR IDENTIFYING POTENTIALLY MALICIOUS MESSAGES

(75) Inventors: Paul Judge, Alpharetta, GA (US);
Dmitri Alperovitch, Atlanta, GA (US);
Sven Krasser, Atlanta, GA (US); Phyllis Adele Schneck, Atlanta, GA (US);
Jonathan Alexander Zdziarski, Milledgeville, GA (US)

(73) Assignee: McAfee, Inc., Santa Clara, CA (US)

( * ) Notice: Subject to any disclaimer, the term of this patent is extended or adjusted under 35 U.S.C. 154(b) by 893 days.

(21) Appl. No.: 11/423,313

(22) Filed: Jun. 9, 2006

(65) Prior Publication Data

US 2006/0251068 A1 Nov. 9, 2006

Related U.S. Application Data

(63) Continuation-in-part of application No. 11/173,941, filed on Jul. 1, 2005, which is a continuation-in-part of application No. 11/142,943, filed on Jun. 2, 2005, application No. 11/423,313, which is a continuation-in-part of application No. 11/383,347, filed on May 15, 2006, and a continuation-in-part of application No. 11/218,689, filed on Sep. 2, 2005, now Pat. No. 7,089,590, which is a continuation of application No. 10/093,553, filed on Mar. 8, 2002, now Pat. No. 6,941,467, application No. 11/423,313, which is a continuation-in-part of application No. 10/094,211, filed on Mar. 8, 2002, now Pat. No. 7,458,098, and a continuation-in-part of application No. 10/094,266, filed on Mar. 8, 2002, now Pat. No. 7,124,438, and a continuation-in-part of application No. 10/361,091, filed on Feb. 7, 2003, now Pat. No. 7,096,498, and a continuation-in-part of application No. 10/373,325, filed on Feb. 24, 2003, now Pat. No. 7,213,260, and a continuation-in-part of application No. 10/361,067, filed on Feb. 7, 2003, now abandoned, and a continuation-in-part of application No. 10/384,924, filed on Mar. 6, 2003.

(60) Provisional application No. 60/625,507, filed on Nov. 5, 2004, provisional application No. 60/736,121, filed on Nov. 10, 2005.

(51) Int. Cl.
*G06F 21/00* (2006.01)

(52) U.S. Cl.
USPC .................. 726/22; 726/23; 726/24; 713/189; 713/190; 713/191; 713/192; 713/193; 713/194

(58) Field of Classification Search
USPC ........................................ 726/22–25; 713/188
See application file for complete search history.

(56) References Cited

U.S. PATENT DOCUMENTS

| 4,289,930 A | 9/1981 | Connolly et al. |
| 4,384,325 A | 5/1983 | Slechta et al. |

(Continued)

FOREIGN PATENT DOCUMENTS

| AU | 2003230606 | 10/2003 |
| AU | 2005304883 | 5/2006 |

(Continued)

OTHER PUBLICATIONS

Article entitled "Learning Limited Dependence Bayesian Classifiers" by Sahami, in *Proceedings of the Second International Conference on Knowledge Discovery and Data Mining*, 1996, pp. 335-338.

(Continued)

*Primary Examiner* — Ghazal Shehni
(74) *Attorney, Agent, or Firm* — Patent Capital Group

(57) ABSTRACT

Computer-implemented systems and methods for identifying illegitimate messaging activity on a system using a network of sensors.

23 Claims, 15 Drawing Sheets

(56) References Cited

U.S. PATENT DOCUMENTS

| | | | |
|---|---|---|---|
| 4,386,416 | A | 5/1983 | Giltner et al. |
| 4,532,588 | A | 7/1985 | Foster |
| 4,713,780 | A | 12/1987 | Schultz et al. |
| 4,754,428 | A | 6/1988 | Schultz et al. |
| 4,837,798 | A | 6/1989 | Cohen et al. |
| 4,853,961 | A | 8/1989 | Pastor |
| 4,864,573 | A | 9/1989 | Horsten |
| 4,951,196 | A | 8/1990 | Jackson |
| 4,975,950 | A | 12/1990 | Lentz |
| 4,979,210 | A | 12/1990 | Nagata et al. |
| 5,008,814 | A | 4/1991 | Mathur |
| 5,020,059 | A | 5/1991 | Gorin et al. |
| 5,051,886 | A | 9/1991 | Kawaguchi et al. |
| 5,054,096 | A | 10/1991 | Beizer |
| 5,105,184 | A | 4/1992 | Pirani et al. |
| 5,119,465 | A | 6/1992 | Jack et al. |
| 5,136,690 | A | 8/1992 | Becker et al. |
| 5,144,557 | A | 9/1992 | Wang |
| 5,144,659 | A | 9/1992 | Jones |
| 5,144,660 | A | 9/1992 | Rose |
| 5,167,011 | A | 11/1992 | Priest |
| 5,210,824 | A | 5/1993 | Putz et al. |
| 5,210,825 | A | 5/1993 | Kavaler |
| 5,235,642 | A | 8/1993 | Wobber et al. |
| 5,239,466 | A | 8/1993 | Morgan et al. |
| 5,247,661 | A | 9/1993 | Hager et al. |
| 5,276,869 | A | 1/1994 | Forrest et al. |
| 5,278,901 | A | 1/1994 | Shieh et al. |
| 5,283,887 | A | 2/1994 | Zachery |
| 5,293,250 | A | 3/1994 | Okumura et al. |
| 5,313,521 | A | 5/1994 | Torii et al. |
| 5,319,776 | A | 6/1994 | Hile et al. |
| 5,355,472 | A | 10/1994 | Lewis |
| 5,367,621 | A | 11/1994 | Cohen et al. |
| 5,377,354 | A | 12/1994 | Scannell et al. |
| 5,379,340 | A | 1/1995 | Overend et al. |
| 5,379,374 | A | 1/1995 | Ishizaki et al. |
| 5,384,848 | A | 1/1995 | Kikuchi |
| 5,404,231 | A | 4/1995 | Bloomfield |
| 5,406,557 | A | 4/1995 | Baudoin |
| 5,414,833 | A | 5/1995 | Hershey et al. |
| 5,416,842 | A | 5/1995 | Aziz |
| 5,418,908 | A | 5/1995 | Keller et al. |
| 5,424,724 | A | 6/1995 | Williams et al. |
| 5,479,411 | A | 12/1995 | Klein |
| 5,481,312 | A | 1/1996 | Cash et al. |
| 5,483,466 | A | 1/1996 | Kawahara et al. |
| 5,485,409 | A | 1/1996 | Gupta et al. |
| 5,495,610 | A | 2/1996 | Shing et al. |
| 5,509,074 | A | 4/1996 | Choudhury et al. |
| 5,511,122 | A | 4/1996 | Atkinson |
| 5,513,126 | A | 4/1996 | Harkins et al. |
| 5,513,323 | A | 4/1996 | Williams et al. |
| 5,530,852 | A | 6/1996 | Meske, Jr. et al. |
| 5,535,276 | A | 7/1996 | Ganesan |
| 5,541,993 | A | 7/1996 | Fan et al. |
| 5,544,320 | A | 8/1996 | Konrad |
| 5,550,984 | A | 8/1996 | Gelb |
| 5,550,994 | A | 8/1996 | Tashiro et al. |
| 5,557,742 | A | 9/1996 | Smaha et al. |
| 5,572,643 | A | 11/1996 | Judson |
| 5,577,209 | A | 11/1996 | Boyle et al. |
| 5,586,254 | A | 12/1996 | Kondo et al. |
| 5,602,918 | A | 2/1997 | Chen et al. |
| 5,606,668 | A | 2/1997 | Shwed |
| 5,608,819 | A | 3/1997 | Ikeuchi |
| 5,608,874 | A | 3/1997 | Ogawa et al. |
| 5,619,648 | A | 4/1997 | Canale et al. |
| 5,621,889 | A | 4/1997 | Lermuzeaux et al. |
| 5,632,011 | A | 5/1997 | Landfield et al. |
| 5,638,487 | A | 6/1997 | Chigier |
| 5,644,404 | A | 7/1997 | Hashimoto et al. |
| 5,657,461 | A | 8/1997 | Harkins et al. |
| 5,673,322 | A | 9/1997 | Pepe et al. |
| 5,675,507 | A | 10/1997 | Bobo, II |
| 5,675,733 | A | 10/1997 | Williams |
| 5,677,955 | A | 10/1997 | Doggett et al. |
| 5,694,616 | A | 12/1997 | Johnson et al. |
| 5,696,822 | A | 12/1997 | Nachenberg |
| 5,706,442 | A | 1/1998 | Anderson et al. |
| 5,708,780 | A | 1/1998 | Levergood et al. |
| 5,708,826 | A | 1/1998 | Ikeda et al. |
| 5,710,883 | A | 1/1998 | Hong et al. |
| 5,727,156 | A | 3/1998 | Herr-Hoyman et al. |
| 5,740,231 | A | 4/1998 | Cohn et al. |
| 5,742,759 | A | 4/1998 | Nessett et al. |
| 5,742,769 | A | 4/1998 | Lee et al. |
| 5,745,574 | A | 4/1998 | Muftic |
| 5,751,956 | A | 5/1998 | Kirsch |
| 5,758,343 | A | 5/1998 | Vigil et al. |
| 5,764,906 | A | 6/1998 | Edelstein et al. |
| 5,768,528 | A | 6/1998 | Stumm |
| 5,768,552 | A | 6/1998 | Jacoby |
| 5,771,348 | A | 6/1998 | Kubatzki et al. |
| 5,778,372 | A | 7/1998 | Cordell et al. |
| 5,781,857 | A | 7/1998 | Hwang et al. |
| 5,781,901 | A | 7/1998 | Kuzma |
| 5,790,789 | A | 8/1998 | Suarez |
| 5,790,790 | A | 8/1998 | Smith et al. |
| 5,790,793 | A | 8/1998 | Higley |
| 5,793,763 | A | 8/1998 | Mayes et al. |
| 5,793,972 | A | 8/1998 | Shane |
| 5,796,942 | A | 8/1998 | Esbensen |
| 5,796,948 | A | 8/1998 | Cohen |
| 5,801,700 | A | 9/1998 | Ferguson |
| 5,805,719 | A | 9/1998 | Pare, Jr. et al. |
| 5,812,398 | A | 9/1998 | Nielsen |
| 5,812,776 | A | 9/1998 | Gifford |
| 5,822,526 | A | 10/1998 | Waskiewicz |
| 5,822,527 | A | 10/1998 | Post |
| 5,826,013 | A | 10/1998 | Nachenberg |
| 5,826,014 | A | 10/1998 | Coley et al. |
| 5,826,022 | A | 10/1998 | Nielsen |
| 5,826,029 | A | 10/1998 | Gore et al. |
| 5,835,087 | A | 11/1998 | Herz et al. |
| 5,845,084 | A | 12/1998 | Cordell et al. |
| 5,850,442 | A | 12/1998 | Muftic |
| 5,855,020 | A | 12/1998 | Kirsch |
| 5,860,068 | A | 1/1999 | Cook |
| 5,862,325 | A | 1/1999 | Reed et al. |
| 5,864,852 | A | 1/1999 | Luotonen |
| 5,878,230 | A | 3/1999 | Weber et al. |
| 5,884,033 | A | 3/1999 | Duvall et al. |
| 5,892,825 | A | 4/1999 | Mages et al. |
| 5,893,114 | A | 4/1999 | Hashimoto et al. |
| 5,896,499 | A | 4/1999 | McKelvey |
| 5,898,830 | A | 4/1999 | Wesinger et al. |
| 5,898,836 | A | 4/1999 | Freivald et al. |
| 5,903,723 | A | 5/1999 | Becker et al. |
| 5,911,776 | A | 6/1999 | Guck |
| 5,923,846 | A | 7/1999 | Gage et al. |
| 5,930,479 | A | 7/1999 | Hall |
| 5,933,478 | A | 8/1999 | Ozaki et al. |
| 5,933,498 | A | 8/1999 | Schneck et al. |
| 5,937,164 | A | 8/1999 | Mages et al. |
| 5,940,591 | A | 8/1999 | Boyle et al. |
| 5,948,062 | A | 9/1999 | Tzelnic et al. |
| 5,958,005 | A | 9/1999 | Thorne et al. |
| 5,963,915 | A | 10/1999 | Kirsch |
| 5,978,799 | A | 11/1999 | Hirsch |
| 5,987,609 | A | 11/1999 | Hasebe |
| 5,987,610 | A | 11/1999 | Franczek et al. |
| 5,991,881 | A | 11/1999 | Conklin et al. |
| 5,999,932 | A | 12/1999 | Paul |
| 6,003,027 | A | 12/1999 | Prager |
| 6,006,329 | A | 12/1999 | Chi |
| 6,012,144 | A | 1/2000 | Pickett |
| 6,014,651 | A | 1/2000 | Crawford |
| 6,023,723 | A | 2/2000 | McCormick et al. |
| 6,029,256 | A | 2/2000 | Kouznetsov |
| 6,035,423 | A | 3/2000 | Hodges et al. |
| 6,052,709 | A | 4/2000 | Paul |
| 6,052,784 | A | 4/2000 | Day |
| 6,058,381 | A | 5/2000 | Nelson |

(56) References Cited

U.S. PATENT DOCUMENTS

| | | |
|---|---|---|
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,073,142 A | 6/2000 | Geiger et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,118,886 A | 9/2000 | Baumgart et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,165,314 A | 12/2000 | Gardner et al. |
| 6,185,314 B1 | 2/2001 | Crabtree et al. |
| 6,185,680 B1 | 2/2001 | Shimbo et al. |
| 6,185,689 B1 | 2/2001 | Todd, Sr. et al. |
| 6,192,360 B1 | 2/2001 | Dumais et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,247,045 B1 | 6/2001 | Shaw et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,266,668 B1 | 7/2001 | Vanderveldt et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,434,624 B1 | 8/2002 | Gai et al. |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,050 B1 | 10/2002 | Pace et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,636,946 B2 | 10/2003 | Jeddelch |
| 6,650,890 B1 | 11/2003 | Iriam et al. |
| 6,654,787 B1 | 11/2003 | Aronson et al. |
| 6,661,353 B1 | 12/2003 | Gopen |
| 6,662,170 B1 | 12/2003 | Dom et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Ko |
| 6,701,440 B1 | 3/2004 | Kim et al. |
| 6,704,874 B1 | 3/2004 | Porras et al. |
| 6,711,127 B1 | 3/2004 | Gorman et al. |
| 6,711,687 B1 | 3/2004 | Sekiguchi |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,116 B1 | 5/2004 | Matsui et al. |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,760,309 B1 | 7/2004 | Rochberger et al. |
| 6,768,991 B2 | 7/2004 | Hearnden |
| 6,769,016 B2 | 7/2004 | Rothwell et al. |
| 6,772,196 B1 | 8/2004 | Kirsch et al. |
| 6,775,657 B1 | 8/2004 | Baker |
| 6,792,546 B1 | 9/2004 | Shanklin et al. |
| 6,880,156 B1 | 4/2005 | Landherr et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,895,438 B1 | 5/2005 | Ulrich |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 6,981,143 B2 * | 12/2005 | Mullen et al. ............... 713/166 |
| 7,051,077 B2 | 5/2006 | Lin |
| 7,076,527 B2 | 7/2006 | Bellegarda et al. |
| 7,089,428 B2 | 8/2006 | Farley et al. |
| 7,089,590 B2 | 8/2006 | Judge et al. |
| 7,092,992 B1 | 8/2006 | Yu |
| 7,093,129 B1 | 8/2006 | Gavagni et al. |
| 7,096,498 B2 | 8/2006 | Judge |
| 7,117,358 B2 | 10/2006 | Bandini et al. |
| 7,124,372 B2 | 10/2006 | Brin |
| 7,124,438 B2 | 10/2006 | Judge et al. |
| 7,131,003 B2 | 10/2006 | Lord et al. |
| 7,143,213 B2 | 11/2006 | Need et al. |
| 7,152,105 B2 * | 12/2006 | McClure et al. ............... 709/224 |
| 7,155,243 B2 | 12/2006 | Baldwin et al. |
| 7,164,678 B2 | 1/2007 | Connor |
| 7,206,814 B2 | 4/2007 | Kirsch |
| 7,209,954 B1 | 4/2007 | Rothwell et al. |
| 7,213,260 B2 | 5/2007 | Judge |
| 7,219,131 B2 | 5/2007 | Banister et al. |
| 7,225,466 B2 | 5/2007 | Judge |
| 7,254,608 B2 | 8/2007 | Yeager et al. |
| 7,254,712 B2 | 8/2007 | Godfrey et al. |
| 7,260,840 B2 | 8/2007 | Swander et al. |

(56) References Cited

U.S. PATENT DOCUMENTS

| | | |
|---|---|---|
| 7,272,149 B2 | 9/2007 | Bly et al. |
| 7,272,853 B2 | 9/2007 | Goodman et al. |
| 7,278,159 B2 | 10/2007 | Kaashoek et al. |
| 7,349,332 B1 | 3/2008 | Srinivasan et al. |
| 7,376,731 B2 | 5/2008 | Khan et al. |
| 7,379,900 B1 | 5/2008 | Wren |
| 7,385,924 B1 | 6/2008 | Riddle |
| 7,458,098 B2 | 11/2008 | Judge et al. |
| 7,460,476 B1 | 12/2008 | Morris et al. |
| 7,461,339 B2 * | 12/2008 | Liao et al. ............ 715/239 |
| 7,496,634 B1 * | 2/2009 | Cooley ............ 709/206 |
| 7,502,829 B2 | 3/2009 | Radatti et al. |
| 7,506,155 B1 | 3/2009 | Stewart et al. |
| 7,519,563 B1 | 4/2009 | Urmanov et al. |
| 7,519,994 B2 | 4/2009 | Judge et al. |
| 7,522,516 B1 | 4/2009 | Parker |
| 7,523,092 B2 | 4/2009 | Andreev et al. |
| 7,543,053 B2 | 6/2009 | Goodman et al. |
| 7,543,056 B2 | 6/2009 | McClure et al. |
| 7,545,748 B1 | 6/2009 | Riddle |
| 7,610,344 B2 | 10/2009 | Mehr et al. |
| 7,617,160 B1 | 11/2009 | Grove et al. |
| 7,620,986 B1 * | 11/2009 | Jagannathan et al. ......... 726/22 |
| 7,624,448 B2 | 11/2009 | Coffman |
| 7,644,127 B2 | 1/2010 | Yu |
| 7,668,951 B2 | 2/2010 | Lund et al. |
| 7,693,947 B2 | 4/2010 | Judge et al. |
| 7,694,128 B2 | 4/2010 | Judge et al. |
| 7,711,684 B2 | 5/2010 | Sundaresan et al. |
| 7,716,310 B2 | 5/2010 | Foti |
| 7,730,316 B1 | 6/2010 | Baccash |
| 7,739,409 B2 | 6/2010 | Yanovsky et al. |
| 7,748,038 B2 | 6/2010 | Olivier et al. |
| 7,779,156 B2 | 8/2010 | Alperovitch et al. |
| 7,779,466 B2 | 8/2010 | Judge et al. |
| 7,870,203 B2 | 1/2011 | Judge et al. |
| 7,899,866 B1 | 3/2011 | Buckingham et al. |
| 7,903,549 B2 | 3/2011 | Judge et al. |
| 7,917,627 B1 | 3/2011 | Andriantsiferana et al. |
| 7,937,480 B2 | 5/2011 | Alperovitch et al. |
| 7,941,523 B2 | 5/2011 | Andreev et al. |
| 7,949,716 B2 | 5/2011 | Alperovitch et al. |
| 7,949,992 B2 | 5/2011 | Andreev et al. |
| 7,966,335 B2 | 6/2011 | Sundaresan et al. |
| 8,042,149 B2 | 10/2011 | Judge |
| 8,042,181 B2 | 10/2011 | Judge |
| 8,045,458 B2 | 10/2011 | Alperovitch et al. |
| 8,051,134 B1 | 11/2011 | Begeja et al. |
| 8,069,481 B2 | 11/2011 | Judge |
| 8,079,087 B1 | 12/2011 | Spies et al. |
| 8,095,876 B1 | 1/2012 | Verstak et al. |
| 8,132,250 B2 | 3/2012 | Judge et al. |
| 8,160,975 B2 | 4/2012 | Tang et al. |
| 8,179,798 B2 | 5/2012 | Alperovitch et al. |
| 8,185,930 B2 | 5/2012 | Alperovitch et al. |
| 8,214,497 B2 | 7/2012 | Alperovitch et al. |
| 2001/0037311 A1 | 11/2001 | McCoy et al. |
| 2001/0049793 A1 | 12/2001 | Sugimoto |
| 2002/0004902 A1 | 1/2002 | Toh et al. |
| 2002/0009079 A1 | 1/2002 | Jungck et al. |
| 2002/0013692 A1 | 1/2002 | Chandhok et al. |
| 2002/0016824 A1 | 2/2002 | Leeds |
| 2002/0016910 A1 | 2/2002 | Wright et al. |
| 2002/0023089 A1 | 2/2002 | Woo |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0051575 A1 | 5/2002 | Myers et al. |
| 2002/0059454 A1 | 5/2002 | Barrett et al. |
| 2002/0062368 A1 | 5/2002 | Holtzman et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112013 A1 | 8/2002 | Walsh |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0152399 A1 | 10/2002 | Smith |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |
| 2002/0178410 A1 | 11/2002 | Haitsma et al. |
| 2002/0188732 A1 | 12/2002 | Buckman et al. |
| 2002/0188864 A1 | 12/2002 | Jackson |
| 2002/0194469 A1 | 12/2002 | Dominique et al. |
| 2002/0199095 A1 | 12/2002 | Bandini et al. |
| 2003/0005326 A1 | 1/2003 | Flemming |
| 2003/0005331 A1 | 1/2003 | Williams |
| 2003/0009554 A1 | 1/2003 | Burch et al. |
| 2003/0009693 A1 | 1/2003 | Brock et al. |
| 2003/0009696 A1 | 1/2003 | Bunker V. et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023736 A1 | 1/2003 | Abkemeier |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028803 A1 | 2/2003 | Bunker, V et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0046253 A1 | 3/2003 | Shetty et al. |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093518 A1 | 5/2003 | Hiraga |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0152076 A1 | 8/2003 | Lee et al. |
| 2003/0152096 A1 | 8/2003 | Chapman |
| 2003/0154393 A1 | 8/2003 | Young |

(56) References Cited

U.S. PATENT DOCUMENTS

| | | |
|---|---|---|
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167308 A1 | 9/2003 | Schran |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0182421 A1 | 9/2003 | Faybishenko et al. |
| 2003/0187936 A1 | 10/2003 | Bodin et al. |
| 2003/0187996 A1 | 10/2003 | Cardina et al. |
| 2003/0204596 A1 | 10/2003 | Yadav |
| 2003/0204719 A1 | 10/2003 | Ben |
| 2003/0204741 A1 | 10/2003 | Schoen et al. |
| 2003/0212791 A1 | 11/2003 | Pickup |
| 2003/0233328 A1 | 12/2003 | Scott et al. |
| 2004/0015554 A1 | 1/2004 | Wilson |
| 2004/0025044 A1 | 2/2004 | Day |
| 2004/0034794 A1* | 2/2004 | Mayer et al. ............... 713/200 |
| 2004/0054886 A1 | 3/2004 | Dickinson et al. |
| 2004/0058673 A1 | 3/2004 | Iriam et al. |
| 2004/0059811 A1 | 3/2004 | Sugauchi et al. |
| 2004/0088570 A1 | 5/2004 | Roberts et al. |
| 2004/0098464 A1 | 5/2004 | Koch et al. |
| 2004/0111519 A1* | 6/2004 | Fu et al. ............... 709/229 |
| 2004/0111531 A1 | 6/2004 | Staniford et al. |
| 2004/0122926 A1 | 6/2004 | Moore et al. |
| 2004/0122967 A1 | 6/2004 | Bressler et al. |
| 2004/0123157 A1* | 6/2004 | Alagna et al. ............... 713/201 |
| 2004/0128355 A1 | 7/2004 | Chao et al. |
| 2004/0139160 A1 | 7/2004 | Wallace et al. |
| 2004/0139334 A1 | 7/2004 | Wiseman |
| 2004/0165727 A1 | 8/2004 | Moreh et al. |
| 2004/0167968 A1 | 8/2004 | Wilson et al. |
| 2004/0177120 A1 | 9/2004 | Kirsch |
| 2004/0203589 A1 | 10/2004 | Wang et al. |
| 2004/0205135 A1 | 10/2004 | Hallam |
| 2004/0221062 A1 | 11/2004 | Starbuck et al. |
| 2004/0236884 A1 | 11/2004 | Beetz |
| 2004/0249895 A1 | 12/2004 | Way |
| 2004/0255122 A1 | 12/2004 | Ingerman et al. |
| 2004/0267893 A1 | 12/2004 | Lin |
| 2005/0021738 A1 | 1/2005 | Goeller et al. |
| 2005/0021997 A1* | 1/2005 | Beynon et al. ............... 713/200 |
| 2005/0033742 A1 | 2/2005 | Kamvar et al. |
| 2005/0052998 A1 | 3/2005 | Oliver et al. |
| 2005/0060295 A1 | 3/2005 | Gould et al. |
| 2005/0060643 A1 | 3/2005 | Glass et al. |
| 2005/0065810 A1 | 3/2005 | Bouron |
| 2005/0086300 A1 | 4/2005 | Yeager et al. |
| 2005/0091319 A1 | 4/2005 | Kirsch |
| 2005/0091320 A1 | 4/2005 | Kirsch et al. |
| 2005/0102366 A1 | 5/2005 | Kirsch |
| 2005/0120019 A1 | 6/2005 | Rigoutsos et al. |
| 2005/0141427 A1 | 6/2005 | Bartky |
| 2005/0149383 A1 | 7/2005 | Zacharia et al. |
| 2005/0159998 A1 | 7/2005 | Buyukkokten et al. |
| 2005/0160148 A1 | 7/2005 | Yu |
| 2005/0192958 A1 | 9/2005 | Widjojo et al. |
| 2005/0193076 A1 | 9/2005 | Flury et al. |
| 2005/0198159 A1 | 9/2005 | Kirsch |
| 2005/0204001 A1 | 9/2005 | Stein et al. |
| 2005/0216564 A1* | 9/2005 | Myers et al. ............... 709/206 |
| 2005/0256866 A1 | 11/2005 | Lu et al. |
| 2005/0262209 A1 | 11/2005 | Yu |
| 2005/0262210 A1 | 11/2005 | Yu |
| 2005/0262556 A1 | 11/2005 | Waisman et al. |
| 2006/0007936 A1 | 1/2006 | Shrum et al. |
| 2006/0009994 A1 | 1/2006 | Hogg et al. |
| 2006/0015563 A1 | 1/2006 | Judge et al. |
| 2006/0015942 A1 | 1/2006 | Judge et al. |
| 2006/0021055 A1 | 1/2006 | Judge et al. |
| 2006/0023940 A1 | 2/2006 | Katsuyama |
| 2006/0031314 A1 | 2/2006 | Brahms et al. |
| 2006/0031483 A1 | 2/2006 | Lund et al. |
| 2006/0036693 A1 | 2/2006 | Hulten et al. |
| 2006/0036727 A1 | 2/2006 | Kurapati et al. |
| 2006/0041508 A1* | 2/2006 | Pham et al. ............... 705/50 |
| 2006/0042483 A1 | 3/2006 | Work et al. |
| 2006/0047794 A1 | 3/2006 | Jezierski |
| 2006/0059238 A1 | 3/2006 | Slater et al. |
| 2006/0095404 A1 | 5/2006 | Adelman et al. |
| 2006/0095586 A1 | 5/2006 | Adelman et al. |
| 2006/0112026 A1 | 5/2006 | Graf et al. |
| 2006/0123083 A1 | 6/2006 | Goutte et al. |
| 2006/0129810 A1 | 6/2006 | Jeong et al. |
| 2006/0149821 A1* | 7/2006 | Rajan et al. ............... 709/206 |
| 2006/0155553 A1 | 7/2006 | Brohman et al. |
| 2006/0168024 A1 | 7/2006 | Mehr et al. |
| 2006/0174337 A1* | 8/2006 | Bernoth ............... 726/11 |
| 2006/0174341 A1 | 8/2006 | Judge |
| 2006/0179113 A1 | 8/2006 | Buckingham et al. |
| 2006/0184632 A1* | 8/2006 | Marino et al. ............... 709/206 |
| 2006/0191002 A1 | 8/2006 | Lee et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0225136 A1 | 10/2006 | Rounthwaite et al. |
| 2006/0230039 A1 | 10/2006 | Shull et al. |
| 2006/0230134 A1 | 10/2006 | Qian et al. |
| 2006/0248156 A1 | 11/2006 | Judge et al. |
| 2006/0253447 A1 | 11/2006 | Judge |
| 2006/0253458 A1 | 11/2006 | Dixon et al. |
| 2006/0253578 A1 | 11/2006 | Dixon et al. |
| 2006/0253579 A1 | 11/2006 | Dixon et al. |
| 2006/0253582 A1 | 11/2006 | Dixon et al. |
| 2006/0253584 A1 | 11/2006 | Dixon et al. |
| 2006/0265747 A1 | 11/2006 | Judge |
| 2006/0267802 A1 | 11/2006 | Judge et al. |
| 2006/0277259 A1 | 12/2006 | Murphy et al. |
| 2007/0002831 A1 | 1/2007 | Allen et al. |
| 2007/0019235 A1 | 1/2007 | Lee |
| 2007/0025304 A1 | 2/2007 | Leelahakriengkrai |
| 2007/0027992 A1 | 2/2007 | Judge et al. |
| 2007/0028301 A1 | 2/2007 | Shull et al. |
| 2007/0043738 A1 | 2/2007 | Morris et al. |
| 2007/0078675 A1 | 4/2007 | Kaplan |
| 2007/0124803 A1 | 5/2007 | Taraz |
| 2007/0130350 A1 | 6/2007 | Alperovitch et al. |
| 2007/0130351 A1 | 6/2007 | Alperovitch et al. |
| 2007/0168394 A1 | 7/2007 | Vivekanand |
| 2007/0195753 A1 | 8/2007 | Judge et al. |
| 2007/0195779 A1 | 8/2007 | Judge et al. |
| 2007/0199070 A1 | 8/2007 | Hughes |
| 2007/0203997 A1 | 8/2007 | Ingerman et al. |
| 2007/0208817 A1 | 9/2007 | Lund et al. |
| 2007/0214151 A1 | 9/2007 | Thomas et al. |
| 2007/0233787 A1 | 10/2007 | Pagan |
| 2007/0239642 A1 | 10/2007 | Sindhwani et al. |
| 2007/0253412 A1 | 11/2007 | Batteram et al. |
| 2008/0005223 A1 | 1/2008 | Flake et al. |
| 2008/0022384 A1 | 1/2008 | Yee et al. |
| 2008/0047009 A1 | 2/2008 | Overcash et al. |
| 2008/0077517 A1 | 3/2008 | Sappington |
| 2008/0082662 A1 | 4/2008 | Dandliker et al. |
| 2008/0091765 A1 | 4/2008 | Gammage et al. |
| 2008/0103843 A1 | 5/2008 | Goeppert et al. |
| 2008/0104180 A1 | 5/2008 | Gabe |
| 2008/0123823 A1 | 5/2008 | Pirzada et al. |
| 2008/0159632 A1 | 7/2008 | Oliver et al. |
| 2008/0175226 A1 | 7/2008 | Alperovitch et al. |
| 2008/0175266 A1 | 7/2008 | Alperovitch et al. |
| 2008/0177684 A1 | 7/2008 | Laxman et al. |
| 2008/0177691 A1 | 7/2008 | Alperovitch et al. |
| 2008/0178259 A1 | 7/2008 | Alperovitch et al. |
| 2008/0178288 A1 | 7/2008 | Alperovitch et al. |
| 2008/0184366 A1 | 7/2008 | Alperovitch et al. |

(56) References Cited

U.S. PATENT DOCUMENTS

| | | |
|---|---|---|
| 2008/0301755 A1 | 12/2008 | Sinha et al. |
| 2008/0303689 A1 | 12/2008 | Iverson |
| 2009/0003204 A1 | 1/2009 | Okholm et al. |
| 2009/0089279 A1 | 4/2009 | Jeong et al. |
| 2009/0103524 A1 | 4/2009 | Mantripragada et al. |
| 2009/0113016 A1 | 4/2009 | Sen et al. |
| 2009/0119740 A1 | 5/2009 | Alperovitch et al. |
| 2009/0122699 A1 | 5/2009 | Alperovitch et al. |
| 2009/0125980 A1 | 5/2009 | Alperovitch et al. |
| 2009/0164582 A1 | 6/2009 | Dasgupta et al. |
| 2009/0192955 A1 | 7/2009 | Tang et al. |
| 2009/0254499 A1 | 10/2009 | Deyo |
| 2009/0254572 A1 | 10/2009 | Redlich et al. |
| 2009/0254663 A1 | 10/2009 | Alperovitch et al. |
| 2009/0282476 A1 | 11/2009 | Nachenberg et al. |
| 2010/0115040 A1 | 5/2010 | Sargent et al. |
| 2010/0306846 A1 | 12/2010 | Alperovitch et al. |
| 2011/0280160 A1 | 11/2011 | Yang |
| 2011/0296519 A1 | 12/2011 | Ide et al. |
| 2012/0011252 A1 | 1/2012 | Alperovitch et al. |
| 2012/0084441 A1 | 4/2012 | Alperovitch et al. |
| 2012/0110672 A1 | 5/2012 | Judge et al. |
| 2012/0174219 A1 | 7/2012 | Hernandez et al. |
| 2012/0204265 A1 | 8/2012 | Judge |
| 2012/0216248 A1 | 8/2012 | Alperovitch et al. |
| 2012/0239751 A1 | 9/2012 | Alperovitch et al. |
| 2012/0240228 A1 | 9/2012 | Alperovitch et al. |
| 2012/0271890 A1 | 10/2012 | Judge et al. |

FOREIGN PATENT DOCUMENTS

| | | |
|---|---|---|
| AU | 2006315184 | 5/2007 |
| AU | 2008207924 | 7/2008 |
| AU | 2008207926 | 7/2008 |
| AU | 2008207930 | 7/2008 |
| AU | 2008323779 | 5/2009 |
| AU | 2008323784 | 5/2009 |
| AU | 2009203095 | 8/2009 |
| CA | 2478299 | 9/2003 |
| CA | 2564533 | 12/2005 |
| CA | 2564533 A1 | 12/2005 |
| CA | 2586709 | 5/2006 |
| CA | 2628189 | 5/2007 |
| CA | 2654796 | 12/2007 |
| CN | 10140166 | 4/2009 |
| CN | 101443736 | 5/2009 |
| CN | 101730892 | 6/2010 |
| CN | 101730904 | 6/2010 |
| CN | 101730903 | 11/2012 |
| CN | 103095672 | 5/2013 |
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1488316 | 12/2004 |
| EP | 1271846 | 7/2005 |
| EP | 1672558 | 6/2006 |
| EP | 1820101 | 8/2007 |
| EP | 1819108 | 6/2008 |
| EP | 1982540 | 10/2008 |
| EP | 2036246 | 3/2009 |
| EP | 2115642 | 11/2009 |
| EP | 2115689 | 11/2009 |
| EP | 2213056 | 8/2010 |
| EP | 2223258 | 9/2010 |
| EP | 2562975 | 2/2013 |
| EP | 2562976 | 2/2013 |
| EP | 2562986 | 2/2013 |
| EP | 2562987 | 2/2013 |
| GB | 2271002 A | 3/1994 |
| GB | 2357932 | 7/2001 |
| IN | 3279-DELNP-2007 | 8/2007 |
| IN | 4233-DELNP-2007 | 8/2008 |
| IN | 4842/CHENP/2009 | 1/2010 |
| IN | 4763/CHENP/2009 | 7/2010 |
| JP | 2000-148276 | 5/2000 |
| JP | 2000-215046 | 8/2000 |
| JP | 2001-028006 | 1/2001 |
| JP | 2003-150482 | 5/2003 |
| JP | 2004-533677 | 11/2004 |
| JP | 2004-537075 | 12/2004 |
| JP | 2005-520230 | 7/2005 |
| JP | 2006-268544 | 10/2006 |
| JP | 18350870 | 12/2006 |
| JP | 18350870 A | 12/2006 |
| JP | 2006350870 | 12/2006 |
| JP | 2007-540073 | 6/2008 |
| JP | 2009-516269 | 4/2009 |
| KR | 10-0447082 | 9/2004 |
| KR | 2006-0012137 | 2/2006 |
| KR | 2006-0028200 | 3/2006 |
| KR | 2006028200 A | 3/2006 |
| KR | 1020060041934 | 5/2006 |
| KR | 10-0699531 | 3/2007 |
| KR | 699531 B1 | 3/2007 |
| KR | 10-0737523 | 7/2007 |
| KR | 737523 B1 | 7/2007 |
| KR | 10-0750377 | 8/2007 |
| KR | 750377 B1 | 8/2007 |
| KR | 447082 Y1 | 12/2009 |
| SG | 106744 | 11/2004 |
| SG | 142513 | 6/2008 |
| WO | WO 96/35994 A1 | 11/1996 |
| WO | WO 99/05814 A2 | 2/1999 |
| WO | WO 99/33188 A2 | 7/1999 |
| WO | WO 99/37066 A1 | 7/1999 |
| WO | WO 00/07312 | 2/2000 |
| WO | WO 00/08543 | 2/2000 |
| WO | WO 00/42748 A1 | 7/2000 |
| WO | WO 00/59167 | 10/2000 |
| WO | WO 01/17165 A2 | 3/2001 |
| WO | WO 01/22686 | 3/2001 |
| WO | WO 01/50691 A2 | 7/2001 |
| WO | WO 01/76181 A2 | 10/2001 |
| WO | WO 01/80480 | 10/2001 |
| WO | WO 01/88834 | 11/2001 |
| WO | WO 02/13469 A2 | 2/2002 |
| WO | WO 02/13489 A2 | 2/2002 |
| WO | WO 02/15521 | 2/2002 |
| WO | WO 02/75547 A1 | 9/2002 |
| WO | WO 02/082293 | 10/2002 |
| WO | WO 02/091706 A1 | 11/2002 |
| WO | WO 03/077071 | 9/2003 |
| WO | WO 2004/061698 | 7/2004 |
| WO | WO 2004/061703 | 7/2004 |
| WO | WO2004061703 A1 | 7/2004 |
| WO | WO 2004/081734 | 9/2004 |
| WO | WO2004088455 A2 | 10/2004 |
| WO | WO 2005/006139 | 1/2005 |
| WO | WO 2005/086437 | 9/2005 |
| WO | WO 2005/119485 | 12/2005 |
| WO | WO 2005/119488 | 12/2005 |
| WO | WO 2005116851 | 12/2005 |
| WO | WO 2006/029399 | 3/2006 |
| WO | WO 2006/119509 | 3/2006 |
| WO | WO 2006/052736 | 5/2006 |
| WO | WO2007030951 A1 | 3/2007 |
| WO | WO 2007/059428 | 5/2007 |
| WO | WO 2007/146690 | 12/2007 |
| WO | WO 2007/146696 | 12/2007 |
| WO | WO 2007/146701 | 12/2007 |
| WO | WO2008008543 A2 | 1/2008 |
| WO | WO 2008/091980 | 7/2008 |
| WO | WO 2008/091982 | 7/2008 |
| WO | WO 2008/091986 | 7/2008 |
| WO | WO 2009/146118 | 2/2009 |
| WO | WO 2009/062018 | 5/2009 |
| WO | WO 2009/062023 | 5/2009 |

(56) References Cited

FOREIGN PATENT DOCUMENTS

OTHER PUBLICATIONS

Article entitled "An Evaluation of Phrasal and Clustered Representations on a Text Categorization Task" by Lewis, in *15th Ann Int'l SIGIR*, Jun. 1992, pp. 37-50.
Book entitled *Machine Learning* by Mitchell, 1997, pp. 180-184.
Article entitled "Hierarchically classifying documents using very few words" by Koller et. al., in *Proceedings of the Fourteenth International Conference on Machine Learning*, 1997.
Article entitled "Classification of Text Documents" by Li et. al., in *The Computer Journal*, vol. 41, No. 8, 1998, pp. 537-546.
Article entitled "Issues when designing filters in messaging systems" by Palme et. al., in 19 *Computer Communications*, 1996, pp. 95-101.
Article entitled "Text Categorization with Support Vector Machines: Learning with Many Relevant Features" by Joachins in *Machine Learning: ECML-98*, Apr. 1998, pp. 1-14.
Article entitled "Smokey: Automatic Recognition of Hostile Messages" by Spertus in *Innovative Applications*, 1997, pp. 1058-1065.
Article entitled "CAFE: A Conceptual Model for Managing Information in Electronic Mail" by Takkinen et al. in *Proc. 31st Annual Hawaii International Conference on System Sciences*, 1998, pp. 44-53.
Article entitled "Spam!" by Cranor et. al. in *Communications of the ACM*, vol. 41, No. 8, Aug. 1998, pp. 74-83.
Article entitled "Sendmail and Spam" by LeFebvre in *Performance Computing*, Aug. 1998, pp. 55-58.
Article entitled "Implementing a Generalized Tool for Network Monitoring" by Ranum et. al. in *LISA IX*, Oct. 26-31, 1997, pp. 1-8.
Article entitled "Method for Automatic Contextual Transposition Upon Receipt of Item of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Article entitled "MIMEsweeper defuses virus network, net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.
Article entitled "Securing Electronic Mail Systems" by Serenelli et al., in *Communications—Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Articule entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls for Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.

Article entitled "Safe Use of X Window System Protocol Across a Firewall" by Kahn, in *Proc. of the Fifth USENIX UNIX Security Symposium*, Jun. 5-7, 1995, pp. 105-116.
Article entitled "Automating the OSI to Internet to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy servers, and data driven attacks" by Farrow *in InfoWorld*, Jun. 19, 1995, vol. 17, No. 25, p. 103.
Article entitled "Learning Rules that Classify E-mail" by Cohen, pp. 1-8. Conference: Machine learning in information access—Spring symposium—Technical Report—American Association for Artifical Intelligence SSS, AAAI Press, Mar. 1996.
Article entitled "Hierarchical Bayesian Clustering for Automatic Text Classification" by Iwayama et al. in *Natural Language*, pp. 1322-1327, vol. 2. Publication date, 1995.
Article entitled "A Comparison of Classifiers and Document Representations for the Routing Problem" by Schutze. pp. 229-237, Publication, 1995.
Article entitled "A Comparative Study on Feature Selection in Text Categorization" by Yang et. al. Machine learning—International Workshop Then Conference, p. 412-420, Jul. 1997.
Website: Technical Focus—Products—Entegrity AssureAccess. www2.entegrity.com. Published prior to May 2006, pp. 1-4.
Website: Create Secure Internet Communication Channels—Atabok Homepage. www.atabok.com, Published Feb. 19, 2002, pp. 1-3.
Website: ATABOK VCNMAIL™ Secure Email Solution—Atabok Related Produces. www.atabok.com, Published Feb. 19, 2002, pp. 1-2.
Website: ATABOK VCN Auto-Exchange™—Atabok Related Produces. www.atabok.com, Pub Feb. 19, 2002, 1 page.
Website: Controlling Digital Assets is a Paramount Need for All Business—Atabok Related Produces. www.atabok.com, Pub. Feb. 19, 2002, 1 page.
Website: Control Your Confidential Communications with ATABOK—Atabok Related Produces. www.atabok.com, Published prior to May 2006, 1 page.
Website: Entrust Entelligence—Entrust Homepage. www.entrust.com, Published prior to May 2006, 1 page.
Website: E-mail Plug-in—Get Technical/Interoperability—Entrust Entelligence. www.entrust.com, Pub. Feb. 19, 2002, 1 page.
Website: E-mail Plug-in—Get Technical/System Requirements—Entrust Entelligence. www.entrust.com, Published Feb. 19, 2002, 1 page.
Website: E-mail Plug-in—Features and Benefits—Entrust Entelligence. www.entrust.com, Published Feb. 19, 2002, pp. 1-2.
Website: Internet Filtering Software—Internet Manager Homepage. www.elronsw.com, Published Feb. 19, 2002, pp. 1-2.
Website: ESKE—Email with Secure Key Exchange—ESKE. www.danu.ie, Published prior to May 2006, p. 1.
Website: Terminet—ESKE. www.danu.ie, Pub. Feb. 19, 2002, p. 1.
Website: Baltimore Focus on e-Security—Baltimore Technologies. www.baltimore.com, Pub. Feb. 19, 2002, p. 1-2.
Website: Go Secure! for Microsoft Exchange—Products/Services—Verisign, Inc. www.verisign.com, Published prior to May 2006, p. 2.
Article entitled "A Comparison of Two Learning Algorithms for Text Categorization" by Lewis et al., in Third Annual Symposium on Document Analysis and Information Retrieval, Apr. 11-13, 1994, pp. 81-92.
Article entitled "An Example-Based Mapping Method for Text Categorization and Retrieval" by Yang et. al., in ACM Transactions on Information Systems, Jul. 1994, vol. 12, No. 3, pp. 252-277.

(56) References Cited

OTHER PUBLICATIONS

Edakandi, Ashwin Examiner's Report for Australian Patent Application No. 2006315184, dated Mar. 31, 2010, 8 pages.
China Patent Agent (H.K.) Ltd., First Office Action for Chinese Patent Application No. 200680050707.7, dated Mar. 9, 2010, 31 pages.
US Patent and Trademark Office Final Office Action Summary for U.S. Appl. No. 11/423,329, mailed Jan. 14, 2010, 21 pages.
US Patent and Trademark Office Nonfinal Office Action Summary for U.S. Appl. No. 11/423,329, mailed Jun. 29, 2009, 43 pages.
US Patent and Trademark Office Nonfinal Office Action Summary for U.S. Appl. No. 11/626,470, mailed Jan. 19, 2010, 45 pages.
US Patent and Trademark Office Final Office Action Summary for U.S. Appl. No. 11/142,943, mailed Apr. 29, 2009, 18 pages.
US Patent and Trademark Office Nonfinal Office Action Summary for U.S. Appl. No. 11/142,943, mailed Dec. 31, 2009, 15 pages.
US Patent and Trademark Office Restriction Requirement for U.S. Appl. No. 11/142,943, mailed Jan. 13, 2009, 7 pages.
US Patent and Trademark Office Nonfinal Office Action Summary for U.S. Appl. No. 11/142,943, mailed Jun. 26, 2008, 59 pages.
US Patent and Trademark Office Nonfinal Office Action Summary for U.S. Appl. No. 11/937,274, mailed Dec. 9, 2009, 53 pages.
US Patent and Trademark Office Nonfinal Office Action Summary for U.S. Appl. No. 11/937,274, mailed Jun. 29, 2009, 46 pages.
US Patent and Trademark Office Nonfinal Office Action Summary for U.S. Appl. No. 11/626,603, mailed Dec. 2, 2009, 47 pages.
US Patent and Trademark Office Restriction Requirement for U.S. Appl. No. 11/626,603, mailed Aug. 11, 2009, 7 pages.
US Patent and Trademark Office Nonfinal Office Action Summary for U.S. Appl. No. 11/626,479, mailed Mar. 17, 2010, 65 pages.
Ando, Ruo, "Real-time neural detection with network capturing", Study report from Information Processing Society of Japan, vol. 2002, No. 12, IPSJ SIG Notes, Information Processing Society of Japan, 2002, Feb. 15, 2002, p. 145-150.
Aikawa, Narichika, "Q&A Collection: Personal computers have been introduced to junior high schools and accessing to the Internet has been started; however, we want to avoid the students from accessing harmful information. What can we do?", DOS/V Power Report, vol. 8, No. 5, Japan, Impress Co., Ltd., May 1, 1998, p. 358 to 361.
Shishibori, Masami, et al., "A Filtering Method for Mail Documents Using Personal Profiles", IEICE Technical Report, The Institute of Electronics, Information and Communication Engineers, vol. 98, No. 486, Dec. 17, 1998, pp. 9-16.
Lane, Terran et al., "Sequence Matching and Learning in Anomaly Detection for Computer Security," AAAI Technical Report WS-97-07, 1997, p. 43 to 49.
Abika.com, "Trace IP address, email or IM to owner or user" http://www.abika.com/help/IPaddressmap.htm, 3 pp. (Jan. 25, 2006).
Abika.com, "Request a Persons Report", http://www.abika.com/forms/Verifyemailaddress.asp, 1 p. (Jan. 26, 2006).
Lough et al., "A Short Tutorial on Wireless LANs and IEEE 802.11", printed on May 27, 2002, in the IEEE Computer Society's Student Newsletter, Summer 1997, vol. 5, No. 2.
Feitelson et al., "Self-Tuning Systems", Mar./Apr. 1999, IEEE, 0740-7459/99, pp. 52-60.
Natsev, Apostol et al., "WALRUS: A Similarity Retrieval Algorithm for Image Databases," Mar. 2004.
Schleimer, Saul, et al., "Winnowing: Local Algorighms for Document Fingerprinting." Jun. 2003.
Sobottka, K., et al., "Text Extraction from Colored Book and Journal Covers", 2000 (pp. 163-176).
Thomas, R., et al., "The Game Goes on: An Analysis of Modern SPAM Techniques," 2006.
Anklesaria, F. et al., "The Internet Gopher Protocol", RFC 1436, Mar. 1993.
Berners-Lee, T. et al., "Uniform Resource Identifiers (URI): Generic Syntax", RFC 2396, Aug. 1998.
Crispin, M., "Internet Message Access Protocol—Version 4rev1", RFC 2060, Dec. 1996.
Franks, J. et al., "HITP Authentication: Basic and Digest Access Authentication", RFC 2617, Jun. 1999.
Klensin, J. et al., "SMTP Service Extensions", RFC 1869, Nov. 1995.
Moats, R., "URN Syntax", RFC 2141, May 1997.
Moore, K., "SMTP Service Extension for Delivery Status Notifications", RFC 1891, Jan. 1996.
Myers, J. et al., "Post Office Protocol—Version 3", RFC 1939, May 1996.
Nielsen, H., et al., "An HTTP Extension Framework", RFC 2774, Feb. 2000.
Postel, J., "Simple Mail Transfer Protocol", RFC 821, Aug. 1982.
Braden, R., "Requirements for Internet Hosts—Application and Support", RFC 1123, Oct. 1989, 98 pages.
Fielding, R. et al., "Hypertext Transfer Protocol—HTTP/1.1", RFC 2616, Jun. 1999, 114 pages.
Krishnaswamy et al—Verity: A QoS Metric for Selecting Web Services and Providers, Proceedings of the Fourth International Conference on Web Information Systems Engineering Workshops (WISEEW'03), IEEE, 2004.
Kamvar et al., The Eigen Trust Algorithm for Reputation Management in P2P Networks, ACM, WWW2003, Budapest, Hungary, May 20-24, 2003, pp. 640-651.
Luk, W., et al. "Incremental Development of Hardware Packet Filters", Proc. International Conference on Engineering of Reconfigurable Systems and Algorithms (ERSA). Jan. 1, 2001. pp. 115-118. XP055049950. Retrieved from the Internet: URL:www.doc.ic.ac.uk/-sy99/c1.ps.
Georgopoulos, C. et al., "A Protocol Processing Architecture Backing TCP/IP-based Security Applications in High Speed Networks". Interworking 2000. Oct. 1, 2000. XP055049972. Bergen. Norway Available online at <URL:http://pelopas.uop.gr/fanis/html_files/pdf_files/papers/invited/12_IW2002.pdf>.
"Network Processor Designs for Next-Generation Networking Equipment". White Paper Ezchip Technologies. XX. XX. Dec. 27, 1999. pp. 1-4. XP002262747.
Segal, Richard, et al. "Spam Guru: An Enterprise Anti-Spam Filtering System", IBM, 2004 (7 pages).
Nilsson, Niles J., "Introduction to Machine Learning, an Early Draft of a Proposed Textbook", Nov. 3, 1998; XP055050127; available online at <URL http://robotics.stanford.edu/~nilsson/MLBOOK.pdf>.
Androutsopoulos, Ion et al., "Learning to Filter Spam E-Mail: A Comparison of a Naive Bayesian and a Memory-Based Approach"; Proceedings of the Workshop "Machine Learning and Textual Information Access"; 4th European Conference on Principles and Practice of Knowledge Discovery in Databases (PKDD-2000). Sep. 1, 2000 [XP055050141] Lyon, France; available online at <URL http://arxiv.org/ftp/cs/papers/0009/0009009.pdf>.
Rennie, J D M, "iFile: An application of Machine Learning to E-Mail Filtering"; Workshop on Text Mining; Aug. 1, 2000. [XP002904311]. pp. 1-6.
Clayton, Richard, "Good Practice for Combating Unsolicited Bulk Email," Demon Internet, May 18, 1999 (16 pages).
IronMail™ Version 2.1, User's Manual. © 2001, published by CipherTrust, Inc., 114 pages [U.S. Appl. No. 10/361,067].
IronMail™ version 2.5, User's Manual, © 2001, published by CipherTrust, Inc., 195 pages [U.S. Appl. No. 10/361,067].
IronMail™ version 2.5.1, User's Manual, © 2001, published by CipherTrust, Inc., 203 pages [U.S. Appl. No. 10/361,067].
IronMail™ version 3.0, User's Manual, © 2002, published by CipherTrust, Inc., 280 pages.
IronMail™ version 3.0.1, User's Manual, © 2002, published by CipherTrust, Inc., 314 pages.
Website: Exchange Business Information Safely & Quickly—Without Compromising Security or Reliability—Atabok Secure Data Solutions, Feb. 19, 2002, 2 pages.
Yuchun Tang, "Granular Support Vector Machines Based on Granular Computing, Soft Computing and Statistical Learning." Georgia State University: May 2006.
Drucker et al; "Support Vector Machines for Spam Categorization"; 1999; IEEE Transactions on Neural Networks; vol. 10, No. 5; pp. 1048-1054.

(56) References Cited

OTHER PUBLICATIONS

Graf et al.; "Parallel Support Vector Machines: The Cascade SVM"; 2005; pp. 1-8.
Rokach, Lior et al.; "Decomposition methodology for classification tasks"; 2005; Springer-Verlag London Limited; Pattern Analysis & Applications; pp. 257-271.
Wang, Jigang et al.; "Training Data Selection for Support Vector Machines"; 2005; ICNC 2005, LNCS 3610; pp. 554-564.
Skurichina, Marina et al.; Bagging, Boosting and the Random Subspace Method for Linear Classifiers; 2002; Springer-Verlag London Limited; pp. 121-135.
Tao, Dacheng et al.; "Asymmetric Bagging and Random Subspace for Support Vector Machines-Based Relevance Feedback in Image Retrieval"; 2006; IEEE Computer Society; pp. 1088-1099.
Kotsiantis, S. B. et al.; "Machine learning: a review of classification and combining techniques"; 2006; Springer; Artificial Intelligence Review; pp. 159-190.
Kane, Paul J. et al. "Quantification of Banding, Streaking and Grain in Flat Field Images", 2000.
Kim, JiSoo et al. "Text Locating from Natural Scene Images Using Image Intensities", 2005 IEEE.
Gupta, et al., "A Reputation System for Peer-to-Peer Networks," ACM (2003).
Golbeck, et al., "Inferring Reputation on the Semantic Web," ACM, 2004.
Okumura, Motonobu, "E-Mail Filtering by Relation Learning", IEICE Technical Report, vol. 103, No. 603, The Institute of Electronics, Information and Communication Engineers, Jan. 19, 2004, vol. 103, p. 1-5 [English Abstract Only].
Inoue, Naomi, "Computer and Communication: Recent State of Filtering Software," ISPJ Magazine, vol. 40, No. 10, Japan, The Institute of Electronics, Information and Communication Engineers, Oct. 15, 1999, vol. 40 p. 1007-1010 [English Abstract Only].
Australian Patent Office Examination Report in Australian Patent Application Serial No. 2003230606 mailed on Apr. 3, 2008.
Australian Patent Office Examination Report No. 1 in Australian Patent Application Serial No. 2009203095 mailed pm Oct. 12, 2010.
Australian Patent Office Examination Report No. 2 in Australian Patent Application Serial No. 2009203095 mailed pm Feb. 2, 2012.
Australian Patent Office Examination Report No. 3 in Australian Patent Application Serial No. 200903095 mailed on Mar. 28, 2012.
Canadian Intellectual Property Office Examination Report in Canadian Patent Application Serial No. 2478299 mailed on Jul. 9, 2010.
European Supplementary Search Report for EP Application No. 03723691.6, dated Jun. 29, 2010, 6 pages.
European Patent Office Action for EP Application No. 03723691.6, dated Oct. 12, 2010, 6 pages.
European Patent Office Communication Pursuant to Article 94(3) EPC in EP Application Serial No. 03723691.3 mailed on Jan. 30, 2013.
European Patent Office Search Report and Opinion in EP Application Serial No. 12189404.2 mailed on Jan. 30, 2013.
European Patent Office Search Report and Opinion in EP Application Serial No. 12189407.5 mailed on Jan. 28, 2013.
European Patent Office Search Report and Opinion in EP Application Serial No. 12189412.5 mailed on Jan. 30, 2013.
European Patent Office Search Report and Opinion in EP Application Serial No. 12189413.3 mailed on Jan. 24, 2013.
First/Consequent Examination Report for in Application No. 2639/DELNP/2004, dated Apr. 8, 2011, 3 pages.
Official Action (with uncertified Translation), Japanese Patent Application No. 2003-575222, Sep. 25, 2009, 13 pages.
PCT International Search Report in PCT International Application Serial No. PCT/US2003/007042 mailed on Nov. 13, 2003.
PCT International Preliminary Examination Report in PCT International Application Serial No. PCT/US2003/007042 mailed on Jan. 29, 2004.
Australian Patent Office Examination Report in Australian Patent Application Serial No. 2005304883 mailed on Apr. 16, 2010.
Canadian Patent Office Action in Canadian Patent Application Serial No. 2586709 mailed on Mar. 20, 2013.
China, State Intellectual Property Office, P.R. China, First Office Action in Chinese Patent Application Serial No. 20050046047 mailed on Mar. 1, 2010.
China, State Intellectual Property Office, P.R. China, Second Office Action in Chinese Patent Application Serial No. 20050046047 mailed on Dec. 7, 2010.
China, State Intellectual Property Office, P.R. China, Decision on Rejection in Chinese Patent Application Serial No. 20050046047 mailed on Jun. 27, 2011.
European Patent Office Supplementary Search Report and Written Opinion in EP Application Serial No. 05823134.1 mailed on Jun. 3, 2013.
Japanese Examiner Koji Tamaki, Office Action in JP App. Ser. No. 2007-540073 dated Dec. 16, 2010.
Japanese Patent Office Action in JP Application No. 2007-540073 dated Jul. 7, 2011 (with uncertified translation).
PCT International Search Report and Written Opinion in PCT Application Serial No. PCT/US2005/039978 mailed on Jul. 8, 2008.
PCT International Preliminary Report on Patentability in PCT Application Serial No. PCT/US2005/039978 mailed on May 5, 2009.
Canadian Office Action in Canadian Patent Application Serial No. 2,628,189 mailed on Dec. 8, 2011.
Canadian Office Action in Canadian Patent Application Serial No. 2,628,189 mailed on Jan. 31, 2013.
First Office Action for Chinese Patent Application Serial No. 200680050707.7 dated Mar. 9, 2010.
European Patent Office Search Report dated Nov. 26, 2010 and Written Opinion in EP Application Serial No. 06839820.5-2416 mailed on Dec. 3, 2010.
European Patent Office Communication Pursuant to Article 94(3) EPC 06839820.5-2416 mailed on Oct. 18, 2011 (including Annex EP Search Report dated Nov. 26, 2010).
PCT International Search Report and Written Opinion in PCT International Patent Application Serial No. PCT/US2006/060771 mailed on Feb. 12, 2008.
PCT International Preliminary Report on Patentability in PCT International Patent Application Serial No. PCT/US2006/060771 mailed on May 14, 2008.
PCT International Search Report and Written Opinion in PCT International Application Serial No. PCT/US2007/070483 mailed on Nov. 28, 2007.
PCT International Preliminary Report on Patentability in PCT International Application Serial No. PCT/US2007/070483 mailed on Dec. 10, 2008.
PCT International Search Report and Written Opinion in PCT International Application Serial No. PCT/US2007/070491 mailed on Dec. 20, 2007.
PCT International Preliminary Report on Patentability in PCT International Application Serial No. PCT/US2007/070491 mailed on Dec. 10, 2008.
Australian Patent Office First Examination Report and SIS in Australian Patent Application Serial No. 2008207924 mailed on Dec. 14, 2011.
State Intellectual Property Office, P.R. China First Office Action dated Nov. 9, 2011 in Chinese Patent Application Serial No. 200880009672.1.
State Intellectual Property Office, P.R. China Second Office Action dated Aug. 9, 2012 in Chinese Patent Application Serial No. 200880009672.1.
State Intellectual Property Office, P.R. China Third Office Action dated Nov. 9, 2012 in Chinese Patent Application Serial No. 200880009672.1.
European Patent Office Invitation Pursuant to Rule 62a(1) EPC mailed on Oct. 11, 2011.
PCT International Search Report in PCT International Application Serial No. PCT/US2008/051865 dated Jun. 4, 2008.
PCT International Preliminary Report on Patentability in PCT Application Serial No. PCT/US2008/051865 mailed on Jul. 28, 2009.
Australian Patent Office Patent Examination Report No. 1 issued in Australian Patent Application Serial No. 2008207930 on Dec. 9, 2011.

(56) References Cited

OTHER PUBLICATIONS

Australian Patent Office Examination Report No. 2 issued in Australian Patent Application Serial No. 2008207930 on Sep. 10, 2012.
China, State Intellectual Property Office, P.R. China, First Office Action in Chinese Patent Application Serial No. 200880009762.0 mailed on Sep. 14, 2011.
EPO Extended Search Report and Opinion in EP Application Serial No. 08728178.8 mailed on Aug. 2, 2012.
PCT International Search Report and Written Opinion in PCT International Application Serial No. PCT/US2008/051876 mailed on Jun. 23, 2008.
PCT International Preliminary Report on Patentability in PCT Application Serial No. PCT/US2008/051876 mailed on Jul. 28, 2009.
EPO Communication Pursuant to Article 94(3) EPC in EP Application Serial No. 08847431.7-2416 mailed on Dec. 11, 2012.
EPO Supplementary European Search Report in EP Application Serial No. 08847431.7-2416 mailed on Dec. 3, 2012.
PCT International Search Report and Written Opinion in PCT Application Serial No. PCT/US2008/082771, mailed on Aug. 24, 2009.
PCT International Preliminary Report on Patentability in PCT Application Serial No. PCT/US2008/082771, mailed on May 11, 2010.

* cited by examiner

SYSTEMS AND METHODS FOR IDENTIFYING POTENTIALLY MALICIOUS MESSAGES

CROSS-REFERENCE TO RELATED APPLICATIONS

This application is a continuation in part and claims priority to and the benefit of U.S. application Ser. No. 11/173,941, entitled, "MESSAGE PROFILING SYSTEMS AND METHODS," filed on Jul. 1, 2005, which is a continuation in part of, and claims priority to and benefit of U.S. application Ser. No. 11/142,943, entitled "SYSTEMS AND METHODS FOR CLASSIFICATION OF MESSAGING ENTITIES," filed on Jun. 2, 2005, both of which claim priority to and the benefit of U.S. Provisional Application Ser. No. 60/625,507, entitled "Classification of Messaging Entities," filed on Nov. 5, 2004, all of which are incorporated herein by reference.

This application is also a continuation-in-part of and claims priority to and the benefit of commonly assigned U.S. patent application Ser. No. 11/383,347, filed May 15, 2006, entitled "CONTENT-BASED POLICY COMPLIANCE SYSTEMS AND METHODS," which claims priority to U.S. Provisional Application Ser. No. 60/736,121, filed Nov. 10, 2005, both of which are incorporated herein by reference.

This application is a continuation in part of and claims priority to and the benefit of commonly assigned U.S. patent application Ser. No. 11/218,689, filed Nov. 10, 2005, both of which are incorporated herein by reference.

This application is a continuation in part of and claims priority to and the benefit of commonly assigned U.S. patent application Ser. No. 11/218,689, entitled "SYSTEMS AND METHODS FOR ADAPTIVE MESSAGE INTERROGATION THROUGH MULTIPLE QUEUES," filed Sep. 2, 2005 now U.S. Pat. No. 7,089,590, which is a continuation of U.S. patent application Ser. No. 10/093,553, entitled "SYSTEMS AND METHODS FOR ADAPTIVE MESSAGE INTERROGATION THROUGH MULTIPLE QUEUES," filed on Mar. 8, 2002, now U.S. Pat. No. 6,941,467, both of which are incorporated herein by reference. This application is also a continuation in part and claims priority to and the benefit of commonly assigned U.S. patent application Ser. No. 10/094,211 now U.S. Pat. No. 7,458,098, entitled "SYSTEMS AND METHODS FOR ENHANCING ELECTRONIC COMMUNICATION SECURITY," and U.S. patent application Ser. No. 10/094,266 now U.S. Pat. No. 7,124,438, entitled "SYSTEMS AND METHODS FOR ANOMALY DETECTION IN PATTERNS OF MONITORED COMMUNICATIONS," both of which were filed on Mar. 8, 2002 and are hereby incorporated by reference in their entirety.

This application is also a continuation in part of and claims to and the benefit of commonly assigned U.S. patent application Ser. No. 10/361,091, filed Feb. 7, 2003 now U.S. Pat. No. 7,096,498, entitled "SYSTEMS AND METHODS FOR MESSAGE THREAT MANAGEMENT," U.S. patent application Ser. No. 10/373,325, filed Feb. 24, 2003 now U.S. Pat. No. 7,213,260, entitled "SYSTEMS AND METHODS FOR UPSTREAM THREAT PUSHBACK," U.S. patent application Ser. No. 10/361,067, filed Feb. 7, 2003 now abandoned, entitled "SYSTEMS AND METHODS FOR AUTOMATED WHITELISTING IN MONITORED COMMUNICATIONS," and U.S. patent application Ser. No. 10/384,924, filed Mar. 6, 2003, entitled "SYSTEMS AND METHODS FOR SECURE COMMUNICATION DELIVERY." The entire disclosure of all of these applications is incorporated herein by reference.

This application is also related to co-pending U.S. patent application Ser. No. 11/423,329 entitled "METHODS AND SYSTEMS FOR EXPOSING MESSAGING REPUTATION TO AN END USER," and U.S. patent application Ser. No. 11/423,308 entitled "SYSTEMS AND METHODS FOR GRAPHICALLY DISPLAYING MESSAGING TRAFFIC," both filed on Jun. 9, 2006. The entire disclosure of each of these applications is incorporated herein by reference.

TECHNICAL FIELD

This document relates generally to electronic communications processing and more particularly to analyzing electronic communications for spoofing and other situations.

BACKGROUND AND SUMMARY

A significant number of Internet users and companies are subject to spoofing attacks wherein an attacker masquerades as another person or company. An example includes a spoofing attack known as phishing wherein an attacker tries to illegally obtain confidential information (e.g., the user's password) by sending phony e-mails or instant messages and making the user believe that the source of the communication is a legitimate company. The technique is often used to try to secure user passwords and other sensitive information such as credit card numbers, bank account information, brokerage information and generally anything that could yield a financial gain in line with fraud operations.

In accordance with the teachings provided herein, systems and methods for operation upon data processing devices are provided in order to overcome one or more of the aforementioned disadvantages or other disadvantages concerning the detection of spoofing type situations. For example, a system and method can include examining whether an electronic communication includes elements associated with a first entity's website and elements associated with a second entity's website. The examination is then used in determining whether a spoofing situation exists with respect to the received electronic communication.

As another example, a computer-implemented method and system can be provided for detecting a spoofing situation with respect to one or more electronic communications, comprising. A determination is performed as to whether the electronic communication includes a textual or graphical reference to a first entity as well as a determination as to whether the textual or graphical reference to the first entity is associated with a link to a second entity. Spoofing is detected with respect to the received electronic communication based upon the determination of whether the textual reference is associated with the link to the second entity.

DETAILED DESCRIPTION

Figure 1:
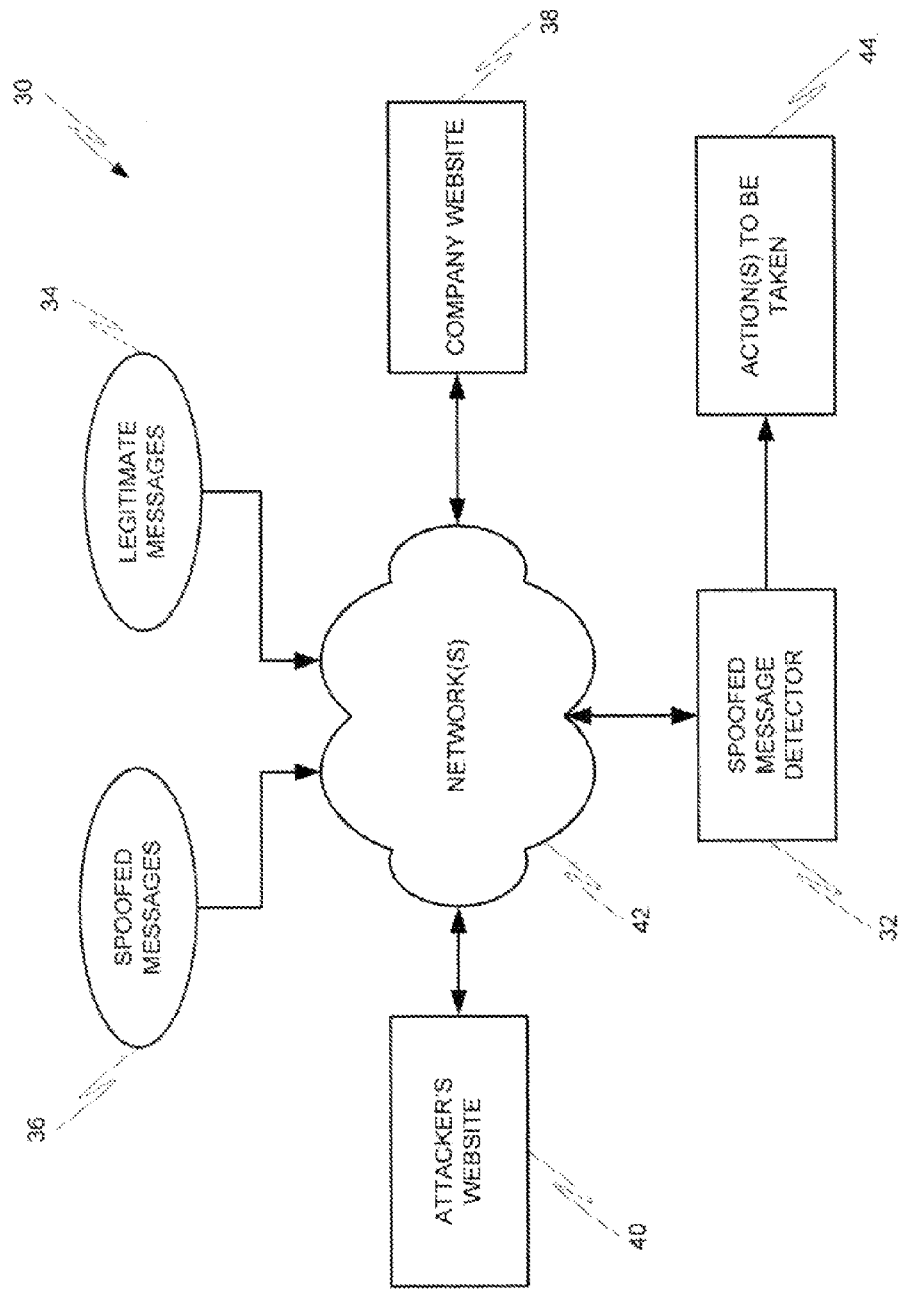
FIG. 1 is a block diagram depicting a computer-implemented system that includes a spoofed message detector to determine whether spoofing is evident with respect to one or more electronic communication messages.

FIG. 1 depicts a computer-implemented system 30 that includes a spoofed message detector 32 to determine whether spoofing is evident with respect to one or more electronic messages (34, 36). As an example, the messages to be analyzed could be legitimate messages 34 from a company or could be spoofed messages 36 from an attacker feigning to be the company.

The legitimate messages 34 contain links to or elements from the company's website 38. The legitimate messages 34 can allow a recipient to access the company website 38 in order to perform a transaction or other activity through the company website 38. In contrast, spoofed messages 36 may contain links to or elements from the company's website 38 while also containing links to or elements from the attacker's website 40. This can result in the user being tricked into interacting with the attacker's website 40 instead of with the legitimate company's website 38.

The spoofed message detector 32 receives electronic communication (36, 34) over one or more networks 42. The spoofed message detector 32 analyzes the messages (36, 34) to determine whether spoofing may have occurred. If suspected spoofing has been detected with respect to an electronic message, then one or more actions 44 can take place with respect to the electronic communication. The actions 44 can be tailored based upon how likely the electronic communication is a spoofed message.

Figure 2:
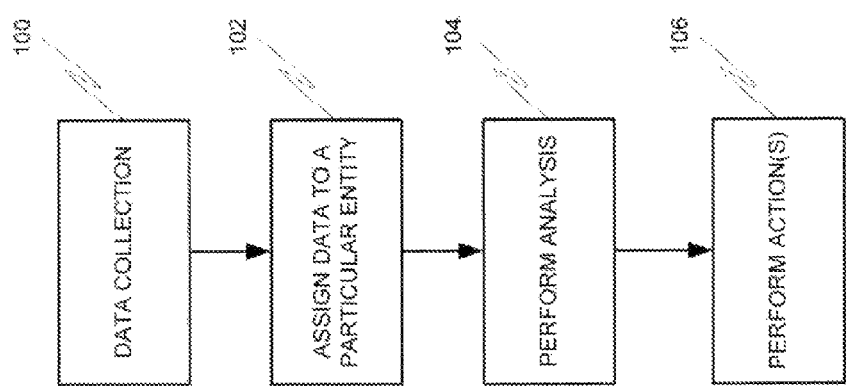
FIG. 2 is a flowchart depicting operations that a message analysis system can utilize in determining the presence of spoofing.

FIG. 2 represents operations that the message analysis system can utilize in determining the presence of spoofing. At step 100, a system can perform data collection to locate messages for analysis. For example, messages may be sent from devices that are located within one or more companies' networks. Such a device can include the IronMail message profiler device available from CipherTrust® (located in Alpharetta, Ga.).

From the data collected in step 100, step 102 determines which data is associated with which company. References to the company in the content, subject heading, and/or To/From/CC/BCC fields can be used to locate messages specific to a company. As an illustration, messages specific to Company A can be separated or otherwise indicated as being associated with Company A. Messages specific to Company B can be separated or otherwise indicated as being associated with Company B, and so forth. Other levels of granularity of separating the message can be performed, such as on an organization level, individual level, etc. In this manner, a user can direct analysis be performed at different levels of granularity.

Any messages that can be determined as legitimate at this stage can be removed from the corpus of messages that are to be analyzed at step 104. For example, messages can be determined as legitimate if their senders' addresses are from an advanced-authorized list of e-mail addresses, held by an ISP, subscriber or other e-mail service provider. At step 104, the remaining messages are analyzed to determine whether any of them are spoofed messages and if so, then one or more actions are performed at step 106 in order to address the spoofing situation.

Figure 3:
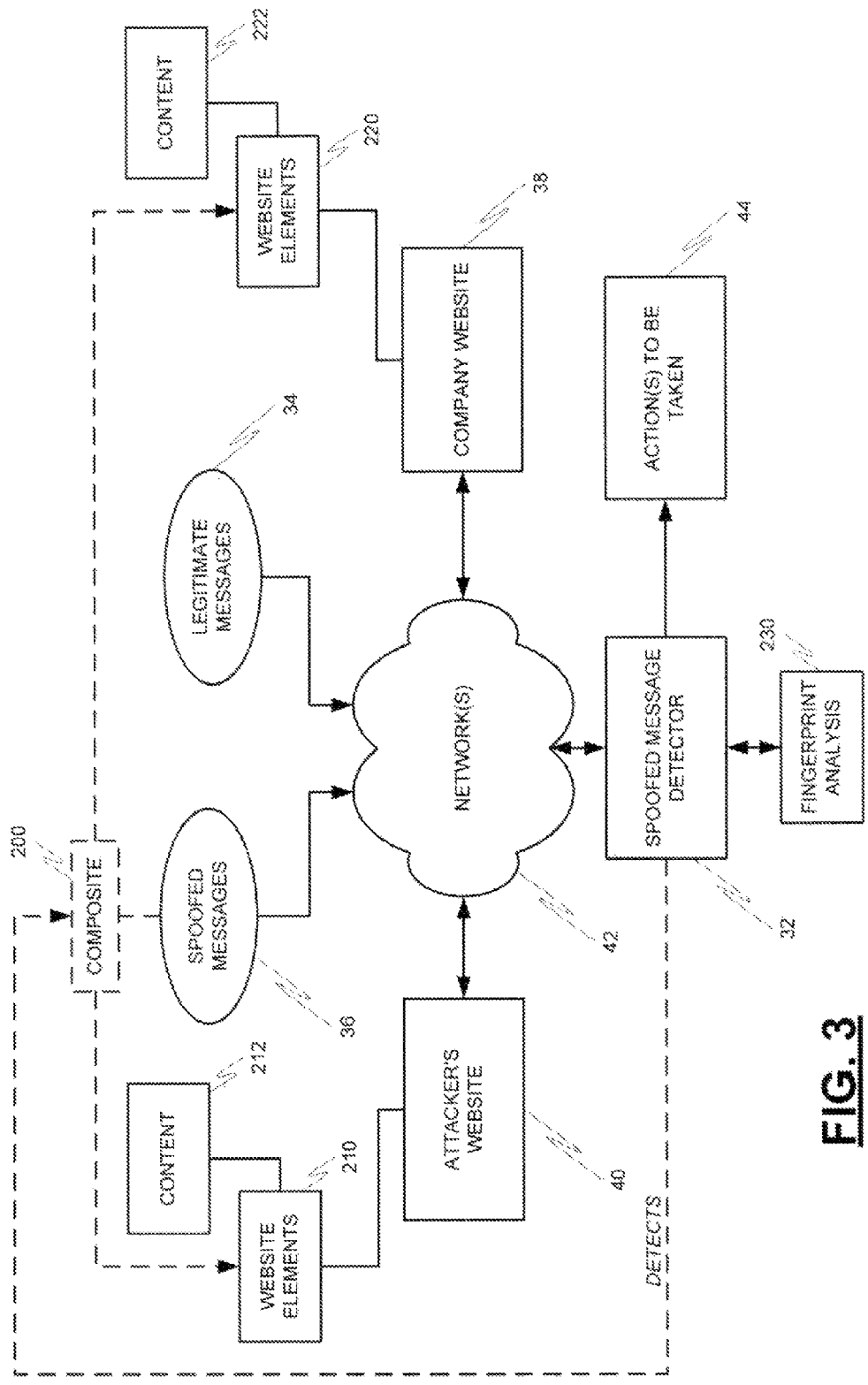
FIG. 3 is a block diagram depicting a spoofed message detector configured to recognize a spoofed message.

A variety of different analysis techniques can be used to determine whether a spoofing situation has arisen at step 104, such as the approach depicted in FIG. 3. With reference to FIG. 3, the spoofed message detector 32 can be configured to recognize that a spoofed message 36 is a composite 200 of one or more elements 220 from a legitimate company website 38 as well as one or more elements 210 from a different entity's website (e.g., attacker's website 40). As an illustration of what website elements (210, 220) might be involved, the spoofed message detector 32 may detect that a message is a composite 200 because it includes content 222 from the legitimate company website 38 as well as content 212 from the attacker's website 40.

The spoofed message detector 32 can perform its composite analysis in many different ways. For example, the spoofed message detector 32 can utilize fingerprint analysis techniques 230 in order to determine whether the message is a composite 200 or not.

Figure 4:
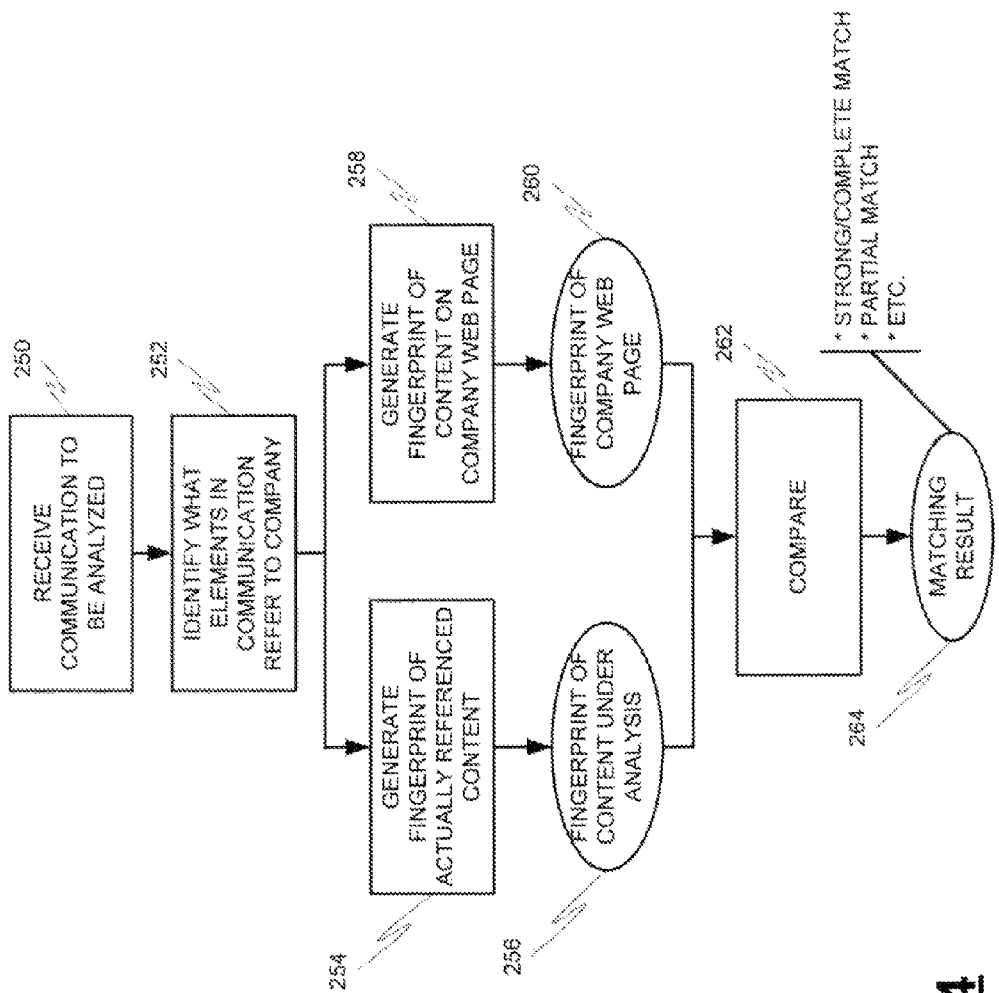
FIG. 4 is a flowchart depicting an operational scenario for comparing two fingerprints of textual or graphical content.

The spoofed message detector 32 can include or have access to a fingerprint analysis software routine or program 230 that will generate a fingerprint of the content 212 associated with a communication under analysis and generate a fingerprint of the actual content 220 used within the company website 38. A comparison of the two fingerprints generated by the fingerprint analysis program 230 is used to determine whether spoofing may have occurred. As operational scenario illustrating the use of fingerprinting analysis 230 is depicted in FIG. 4. It should also be understood that the fingerprinting analysis can be used to locate legitimate content. Such legitimate content can also be sorted for later analysis, such as, for example, trend analysis (e.g., how many times a legitimate usage is observed versus how many times a malicious usage is observed). Furthermore, it should be noted that instances of malicious usages can be stored for later use as evidence in a civil case or criminal case, or used in an administrative proceeding to shut malicious sites down.

With reference to FIG. 4, a communication to be analyzed is received by the spoofed message detector at process block 250. It should be understood that in various examples, the spoofed message detector can reside within an enterprise network, or any other generic location where messaging traffic may be observed. Moreover, when the spoofed message detector resides within an enterprise network, it should be noted that the detector can examine messaging traffic regardless of the originator of the message. For example, outgoing messages from the enterprise network may be examined to ensure that employees are not misusing the company mark or attempting to commit fraud with outsiders using company machines. Similarly, incoming messages maybe examined to protect employees from spoofing attacks by outsiders.

The spoofed message detector 32 identifies at process block 252 the different pieces of content referenced in the communication, such as what company-related content is being pointed to or hyperlinked in the communication. For example, a hyperlink in the communication might contain a textual description that indicates that it is a link to company content but instead provides a link to content on another website (e.g., an attacker's website)—this is an example of a communication faking an association with a company. The content is accessed and retrieved via the URL that is embodied in the hyperlink.

At process block 254, a fingerprint 256 is generated of the content that is actually pointed to or referenced in the communication that is under analysis. The fingerprint 256 is then made available to process block 262 which performs a comparison of fingerprint 256 with a fingerprint 260 that had been generated at process block 258. The comparison operation at process block 262 produces a matching result 264 indicative of how well the two compared fingerprints (256, 260) matched. A strong or complete match of the two fingerprints (256, 260) can provide evidence that spoofing has not occurred, while a partial match or a totally incomplete match can provide evidence that spoofing may be present.

As described above, it should be understood that various actions can be taken responsive to detecting suspected spoofing. For example, among others, suspected spoofing attacks can be added to a brand-abuse database, whereby messaging data can be combined with existing brand protection techniques.

It should be understood that similar to the other processing flows described herein, the steps and the order of the steps in this flowchart may be altered, modified and/or augmented and still achieve the desired outcome. For example, the generation of specific company's content fingerprint at process block 258 may be done in real-time or in near-real-time, such as when it has been discovered that the communication under analysis is referencing the specific company. The company content fingerprint could also be generated before the communication has been received for analysis. Furthermore, the comparison can use one or more techniques to determine whether a link or web page matches a legitimate link or web page.

As another example of the variety of processing flows that can be performed, the analysis does not have to include fingerprinting, but different comparison techniques can be utilized, such as a character-by-character comparison of the content involved in the analysis. Moreover, in various environments, different weightings can be applied to the different comparison techniques. If fingerprinting is utilized, then it should also be understood that different types of fingerprinting algorithms can be employed, such as the winnowing fingerprint algorithm discussed in the following reference: S. Schleimer et al. "Winnowing: Local Algorithms for Document Fingerprinting" (SIGMOD 2003, Jun. 9-12, 2003, San Diego, Calif.). An example of an application of the winnowing fingerprinting algorithm is shown in FIG. 5.

Figure 5:
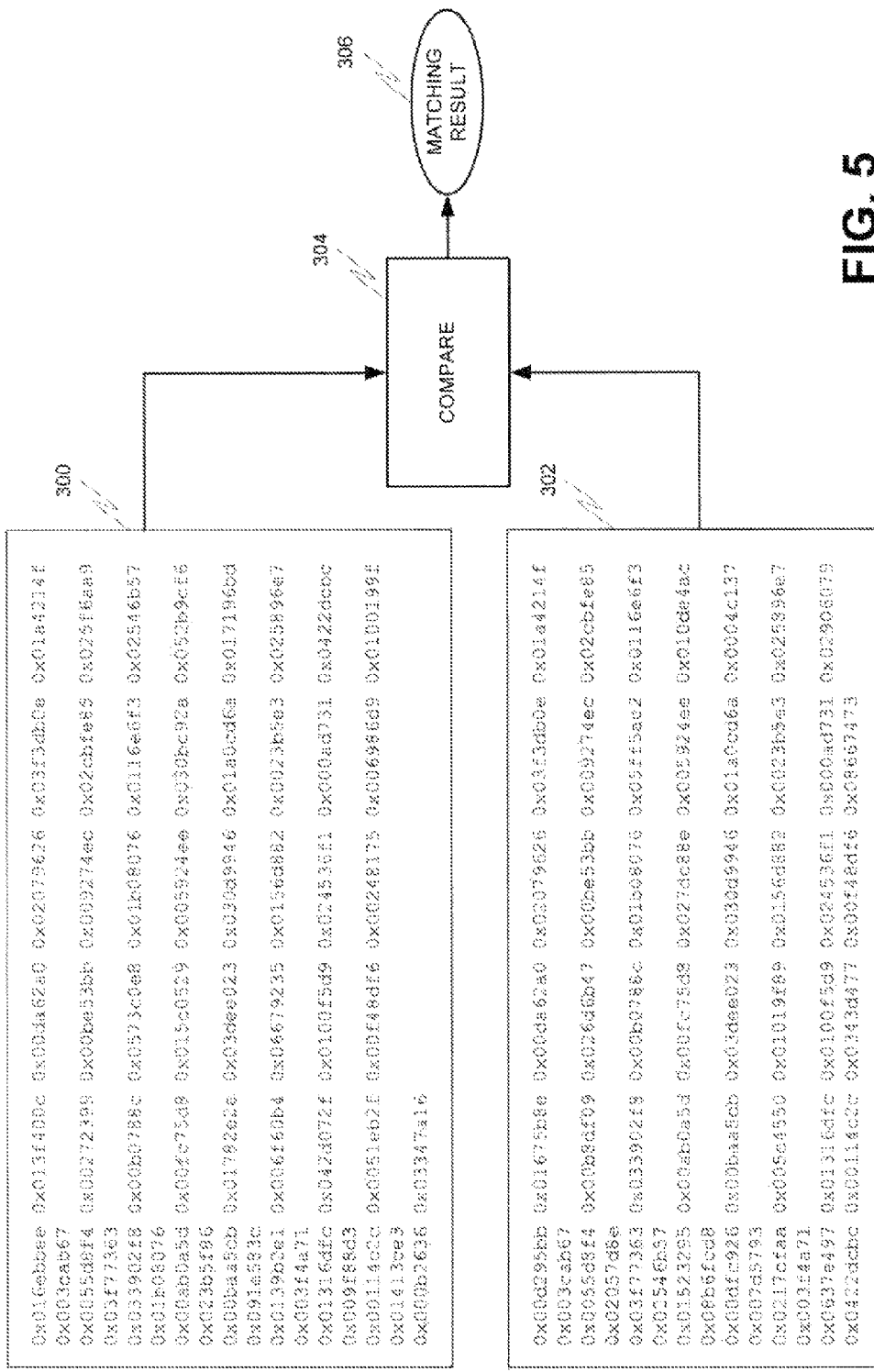
FIG. 5 is a process flow diagram depicting application of a winnowing fingerprinting algorithm in order to detect spoofing.

With reference to FIG. 5, a fingerprint of a "real" (i.e., authentic) login page of a company website is shown at 300. A fingerprint of the actual content that was contained in a communication purporting to be from the company is shown at 302. While many of the prints between fingerprints 300 and 302 may match, there are a number of significant departures between the two fingerprints 300 and 302. Accordingly, comparison operation 304 will produce a matching result 306 that would indicate that there is evidence of spoofing.

Figure 6:
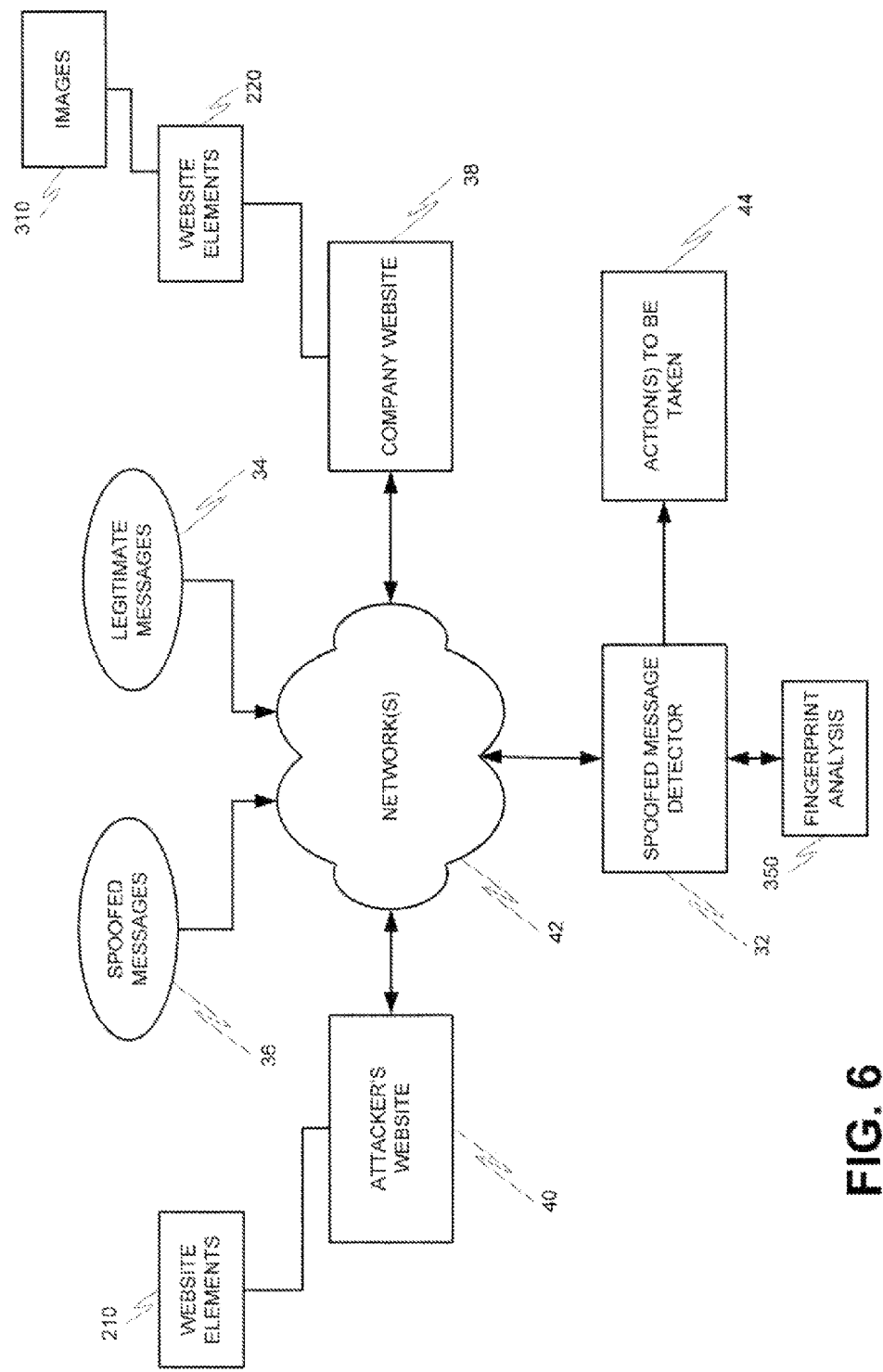
FIG. 6 is a block diagram depicting a spoofed message detector configured to detect whether spoofing has occurred with respect to images.

FIG. 6 depicts a spoofed message detector 32 that has been configured to detect whether spoofing may have occurred with respect to images 310 that have been incorporated into or is referenced by a message. Attackers may have downloaded images (e.g., company logos or other source indicating images, etc.) from the company's website. Accordingly, a spoofing situation could involve a composite 200 of website elements (e.g., images) from a company's website 38 as well as from an attacker's website 40. The spoofed message detector 32 can include or have access to a fingerprint analysis software routine or program 350 that will generate a fingerprint of an image 300 associated with a communication under analysis and generate a fingerprint of the actual image 310 used within the company website 38. A comparison of the two fingerprints generated by the fingerprint analysis program 350 is used to determine whether spoofing may have occurred.

As an illustration in detecting this type of spoofing, a company's images can be fingerprinted (e.g., by applying an md5 algorithm) and then these fingerprints can be compared against that of the communication in question or destination phishing website. Any matches not coming from the company's IPs can be deemed to be strong evidence of phishing. This could force phishers to modify their images which would result in more work for the phishers as well as increase the likelihood that people will not be fooled.

Figure 7:
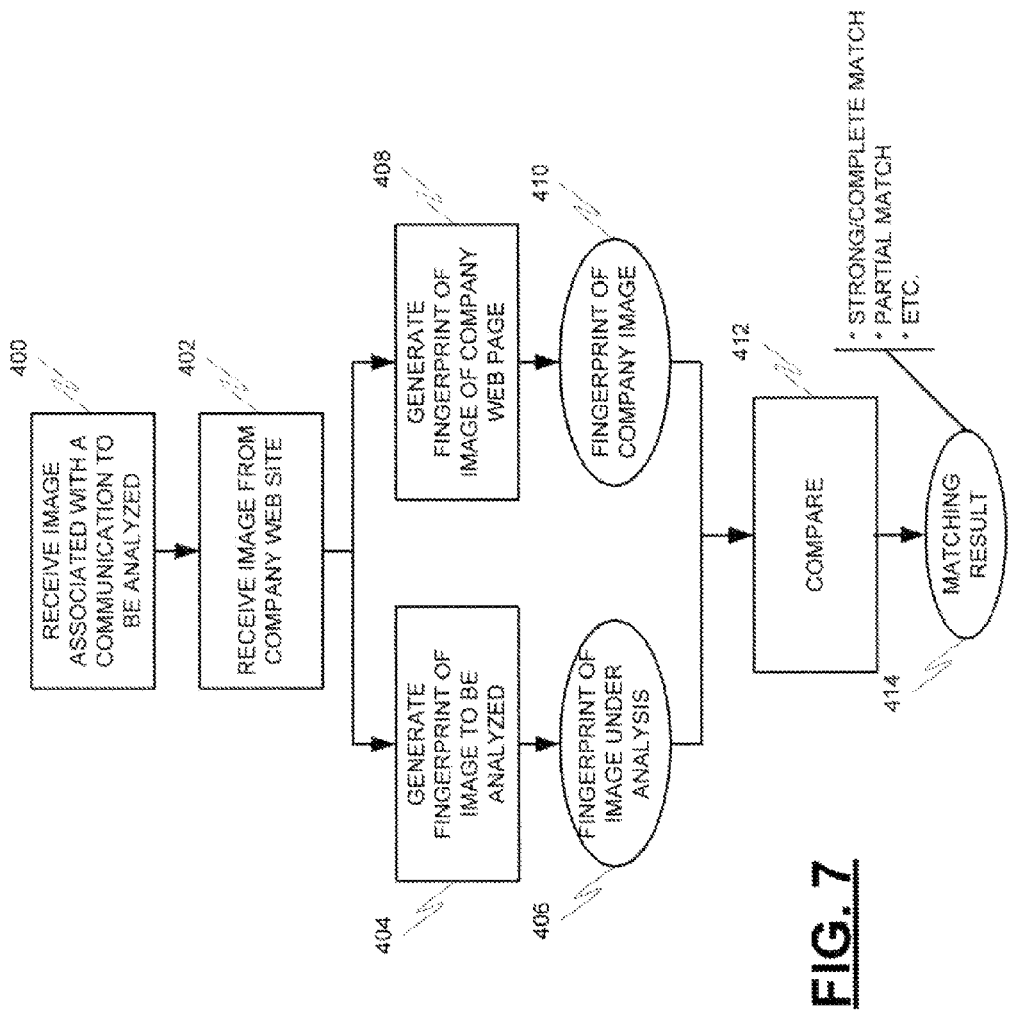
FIG. 7 is a flowchart depicting an operational scenario for using fingerprint analysis in detecting spoofing.

An operational scenario illustrating the use of fingerprint analysis 350 is depicted in FIG. 7. With reference to FIG. 7, an image is received at 400 that is associated with a communication to be analyzed. At step 402, the image from the company website is obtained. This image could have been obtained before or after the communication to be analyzed has been received.

At step 404, a fingerprint 406 of the image to be analyzed is generated. Correspondingly, at step 408, a fingerprint 410 of the company's image is generated. It is noted that the fingerprint 410 of the company's image could be generated before or after the communication to be analyzed is received.

The fingerprints 406 and 410 are then made available to process block 412 which performs a comparison of the fingerprints 406 and 410. The comparison operation at process block 412 produces a matching result 414 indicative of how well the two fingerprints (406, 410) matched. A strong or complete match of the two fingerprints (406, 410) can provide evidence that spoofing has not occurred, while a partial match or a totally incomplete match can provide evidence that spoofing may be present.

Figure 8:
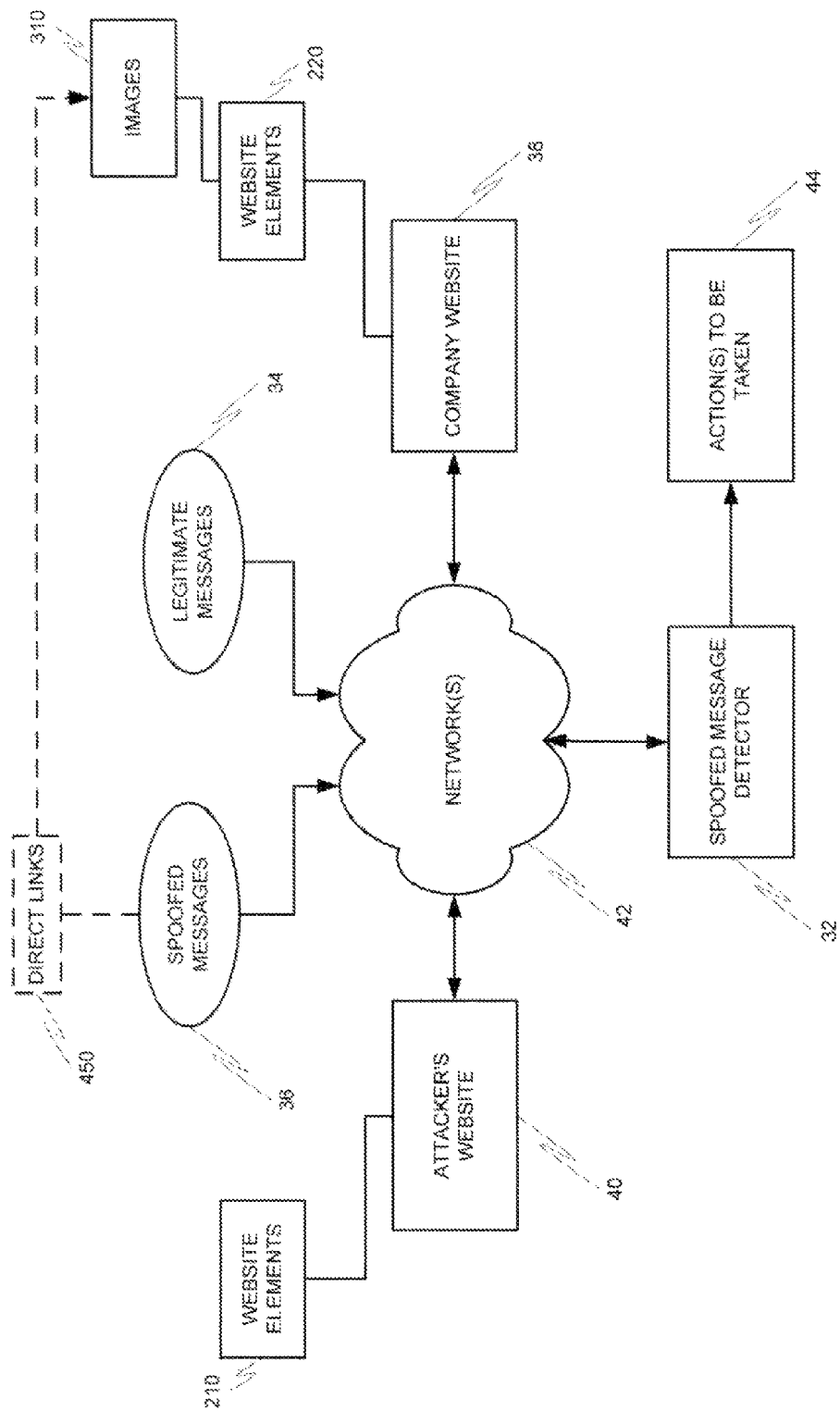
FIG. 8 is a block diagram depicting a spoofed message detector configured to detect whether spoofing may have occurred with respect to communications that have direct links to a real website's images.

FIG. 8 depicts a spoofed message detector 32 that has been configured to detect whether spoofing may have occurred with respect to communications that have direct links 450 to the real website's images 310. An inventory of all the URLs belonging to a company can be performed periodically to reflect changes to a company's URLs. This inventory could be cross-referenced with a list of URLs permitted for real company communications. The inventory could also be cross-referenced with a fraud database in case any of the URLs that appear are not listed as officially belonging to the company. Any message that uses a mixture of real company URLs and fake URLs could be detected. Not only could this detect phishing but also trademark and other violations. If a phisher stops using valid company URLs, then message filters will be able to identify illegitimate mail, which would push phishers out into the open.

Figure 9:
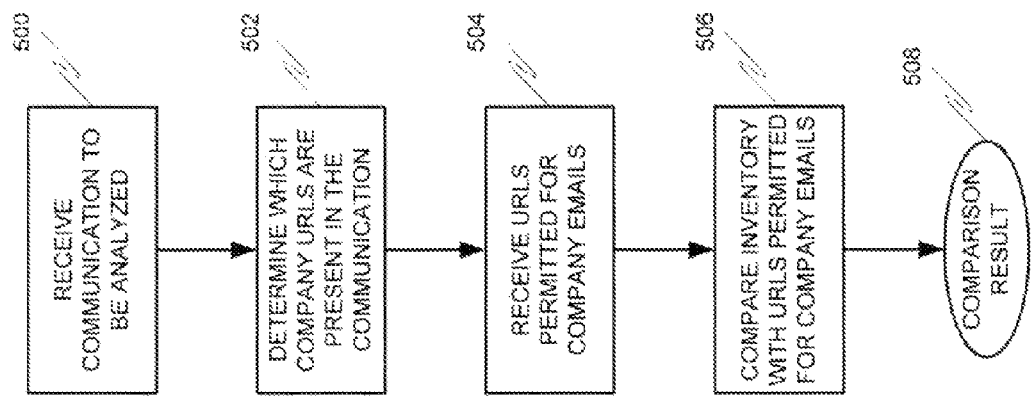
FIG. 9 is a flowchart depicting an operational scenario illustrating the analysis of direct links.

An operational scenario illustrating the analysis of direct links 450 is depicted in FIG. 9. With reference to FIG. 9, a communication is received at 500 that is to be analyzed in order to determine whether a spoofing situation (e.g., phishing) is present. At step 502, a list is generated of which company URLs are present in the communication. Either before or after the communication to be analyzed was received, process block 504 receives which URLs are allowed to be used for a company communication. Process block 506 does a comparison between the corpus of URLs obtained in process block 502 with the corpus of URLs obtained in process block 504. The comparison result 508 is indicative of whether spoofing has occurred.

Figure 10:
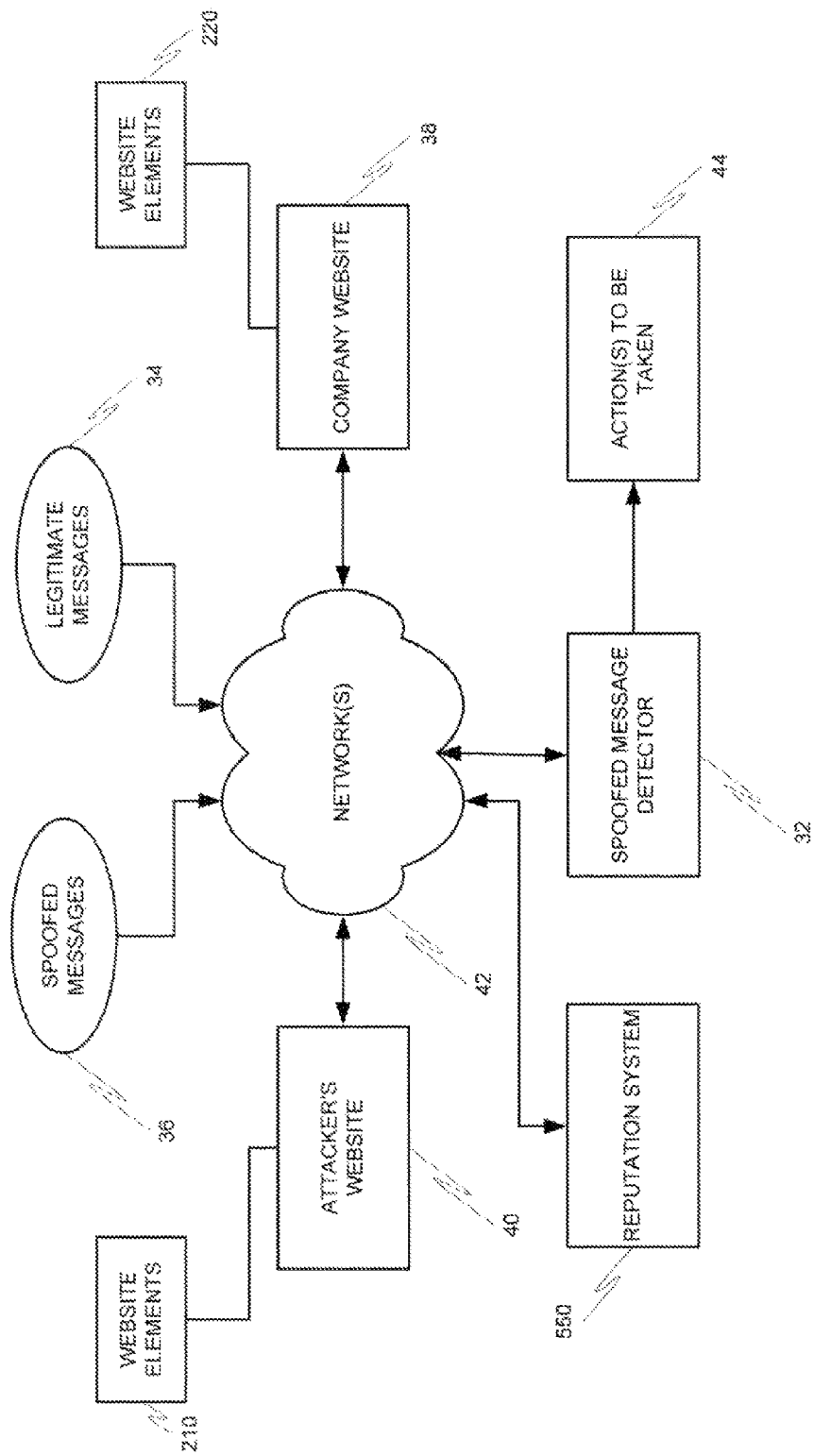
FIG. 10 is a block diagram depicting a spoofed message detector configured to be used with a reputation system.

FIG. 10 depicts a spoofed message detector 32 that has been configured to be used with a reputation system 550. A reputation system 550 keeps track of whether a communication sender engages in good behavior (such as sending legitimate messages 34), bad behavior (such as sending spam, malicious code, or spoofed messages 36). By tracking sender behavior over time, a database of sender reputation can grow and be refined.

Many different types of reputations system can be used with the spoofed message detector 32. An example includes the reputation systems and methods disclosed in the commonly assigned U.S. patent application entitled "Systems and Methods for Classification of Messaging Entities" (Ser. No. 11/142,943; filed Jun. 2, 2005). As another example, the spoofed message detector 32 can be used with a system, such as the TrustedSource software system provided by the assignee of this application. The TrustedSource software system receives and analyzes billions of messages per month from CipherTrust's network of more than 4000 IronMail Gateway appliances deployed globally. TrustedSource assigns a reputation score and further classifies senders as good, bad or suspicious based on an in-depth analysis by processing more than a dozen behavior attributes to profile each sender. As an illustration, TrustedSource combines traffic data, whitelists, blacklists and network characteristics with CiperTrust's global customer base.

The results of whether a message is a spoofed message can be provided to such reputation systems as part of its determination of what reputation should be ascribed to a particular sender. As an illustration, the determination by the spoofed message detector 32 (through one or more of the techniques disclosed herein) that a sender is sending spoofed messages can be used by a reputation system 550 to adversely affect the reputation of the sender.

Figure 11A:
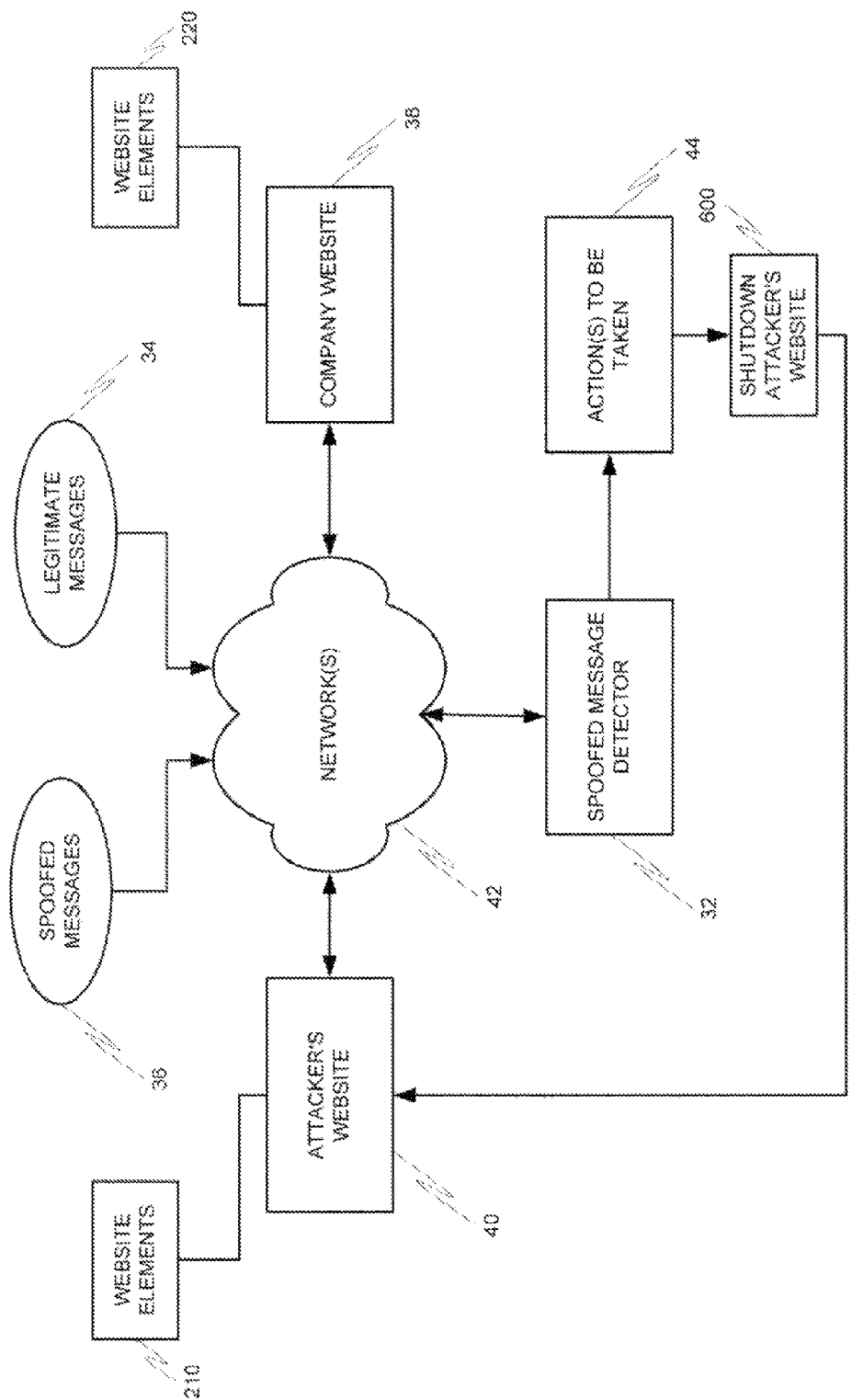
FIGS. 11A and 11B are block diagrams illustrating actions that can be taken based upon the results of a spoofed message detector.

As other examples of how the results of a spoofed message detector 32 can be used, FIG. 11A illustrates that an action 44 that can be taken based upon the results of the spoofed message detector 32 is to shutdown the attacker's website 40 as indicated at 600. The shutdown can be accomplished in a variety of ways, such to inform the Internet Service Provider (ISP) that the attacker's website 40 is associated with improper behavior (i.e., spoofing activities). Other ways could include a more automated approach to shutting down the attacker's website.

Figure 11B:
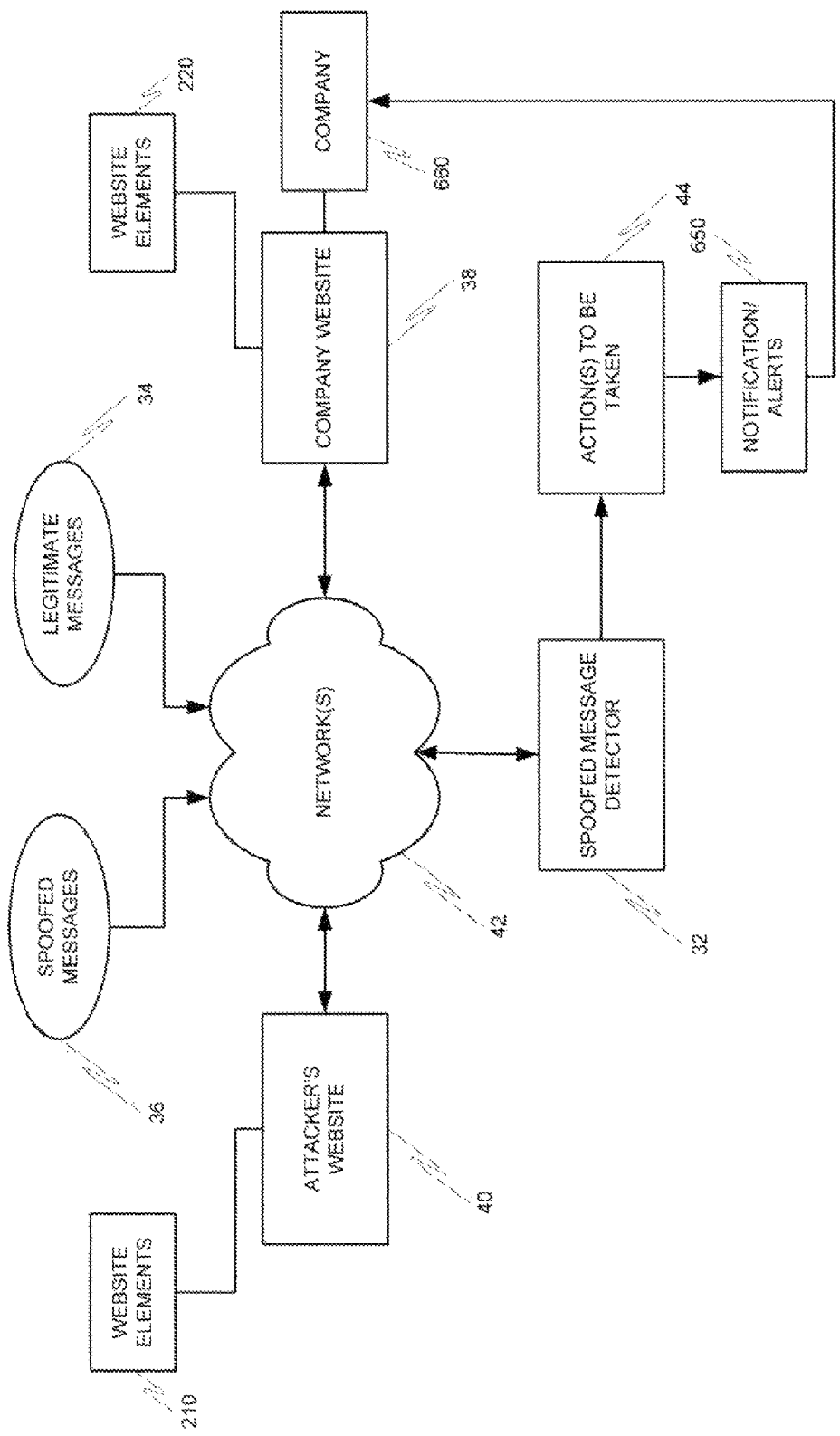

FIG. 11B illustrates that an action 44 could include modifications/alerts 650 being sent to the company 660 associated with the website 38. The company 660 is thereby aware of the illegitimate use of their identity and can decide what additional actions need to be taken. Additional actions could include pursuing legal action against the attacker, notifying persons (e.g., customers) to be aware of this phishing activity, etc.

While examples have been used to disclose the invention, including the best mode, and also to enable any person skilled in the art to make and use the invention, the patentable scope of the invention is defined by claims, and may include other examples that occur to those skilled in the art. For example, in addition to or in place of the other spoof message detection approaches discussed herein, a spoof message detector can be configured to determine whether a target/href mismatch has occurred in a communication under analysis. For example, a communication may indicate as its target http://www.ebay.com when it is really linking to http://215.32.44.3-ebay.com. Such a mismatch indicates that spoofing has occurred. This could be used in place of or to supplement the spoofing determinations performed by the other approaches discussed herein.

Figure 12:
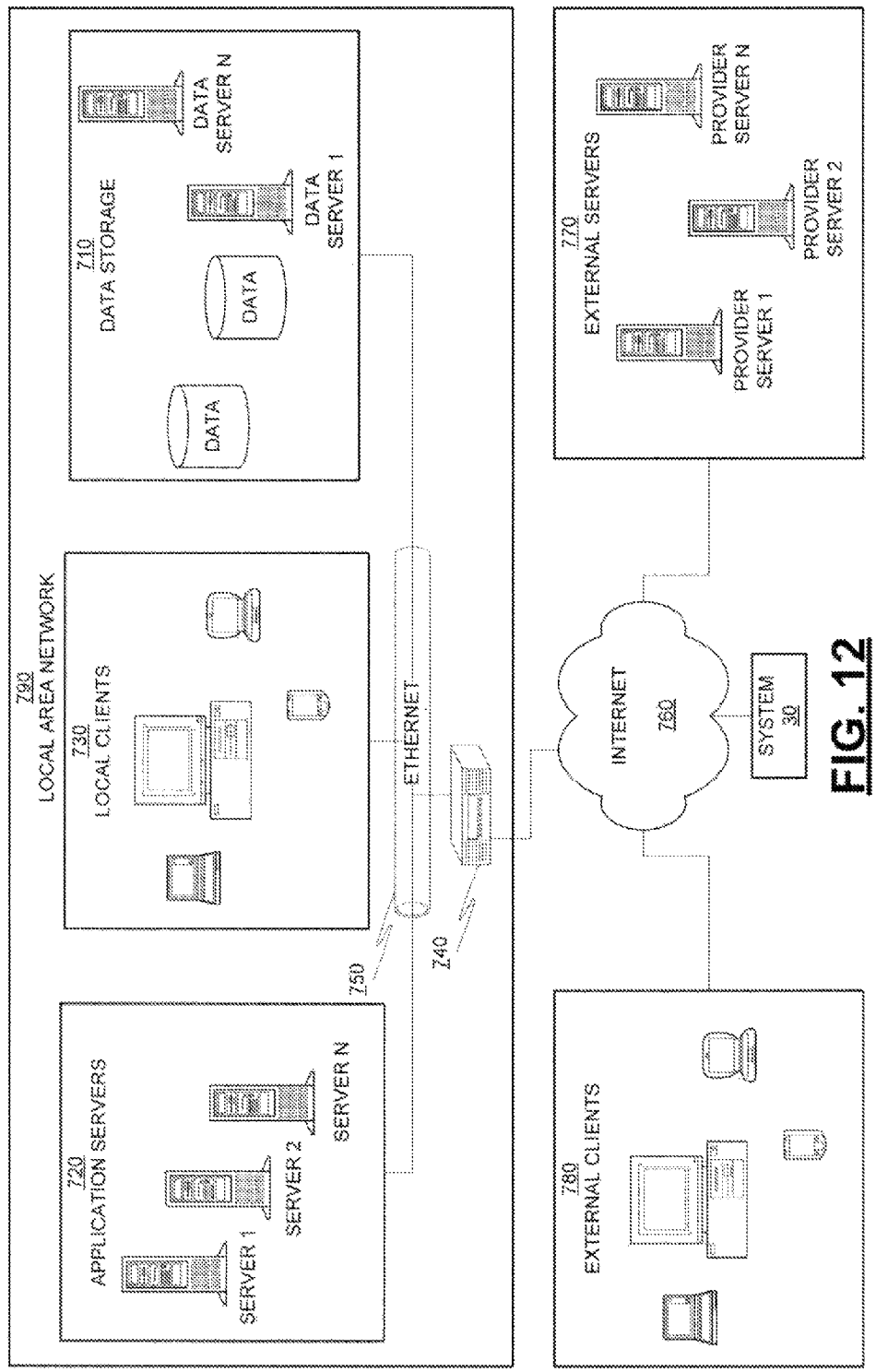
FIG. 12 is a block diagram depicting a server access architecture.

The systems and methods disclosed herein may be implemented on various types of computer architectures, such as for example on different types of networked environments. As an illustration, FIG. 12 depicts a server access architecture within which the disclosed systems and methods may be used (e.g., as shown at 30 in FIG. 12). The architecture in this example includes a corporation's local network 790 and a variety of computer systems residing within the local network 790. These systems can include application servers 720 such as Web servers and e-mail servers, user workstations running local clients 730 such as e-mail readers and Web browsers, and data storage devices 710 such as databases and network connected disks. These systems communicate with each other via a local communication network such as Ethernet 750. Firewall system 740 resides between the local communication network and Internet 760. Connected to the Internet 760 are a host of external servers 770 and external clients 780.

Local clients 730 can access application servers 720 and shared data storage 710 via the local communication network. External clients 780 can access external application servers 770 via the Internet 760. In instances where a local server 720 or a local client 730 requires access to an external server 770 or where an external client 780 or an external server 770 requires access to a local server 720, electronic communications in the appropriate protocol for a given application server flow through "always open" ports of firewall system 740.

A system 30 as disclosed herein may be located in a hardware device or on one or more servers connected to the local communication network such as on the Internet 760 and/or Ethernet 780 and logically interposed between the firewall system 740 and the local servers 720 and clients 730. Application-related electronic communications attempting to enter or leave the local communications network through the firewall system 740 are routed to the system 30.

System 30 could be used to handle many different types of e-mail and its variety of protocols that are used for e-mail transmission, delivery and processing including SMTP and POP3. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent. In addition, the IMAP protocol has evolved as an alternative to POP3 that supports more advanced interactions between e-mail servers and clients. This protocol is described in RFC 2060.

Other communication mechanisms are also widely used over networks. These communication mechanisms include, but are not limited to, Voice Over IP (VoIP) and Instant Messaging. VoIP is used in IP telephony to provide a set of facilities for managing the delivery of voice information using the Internet Protocol (IP). Instant Messaging is a type of communication involving a client which hooks up to an instant messaging service that delivers communications (e.g., conversations) that can take place in realtime.

Figure 13:
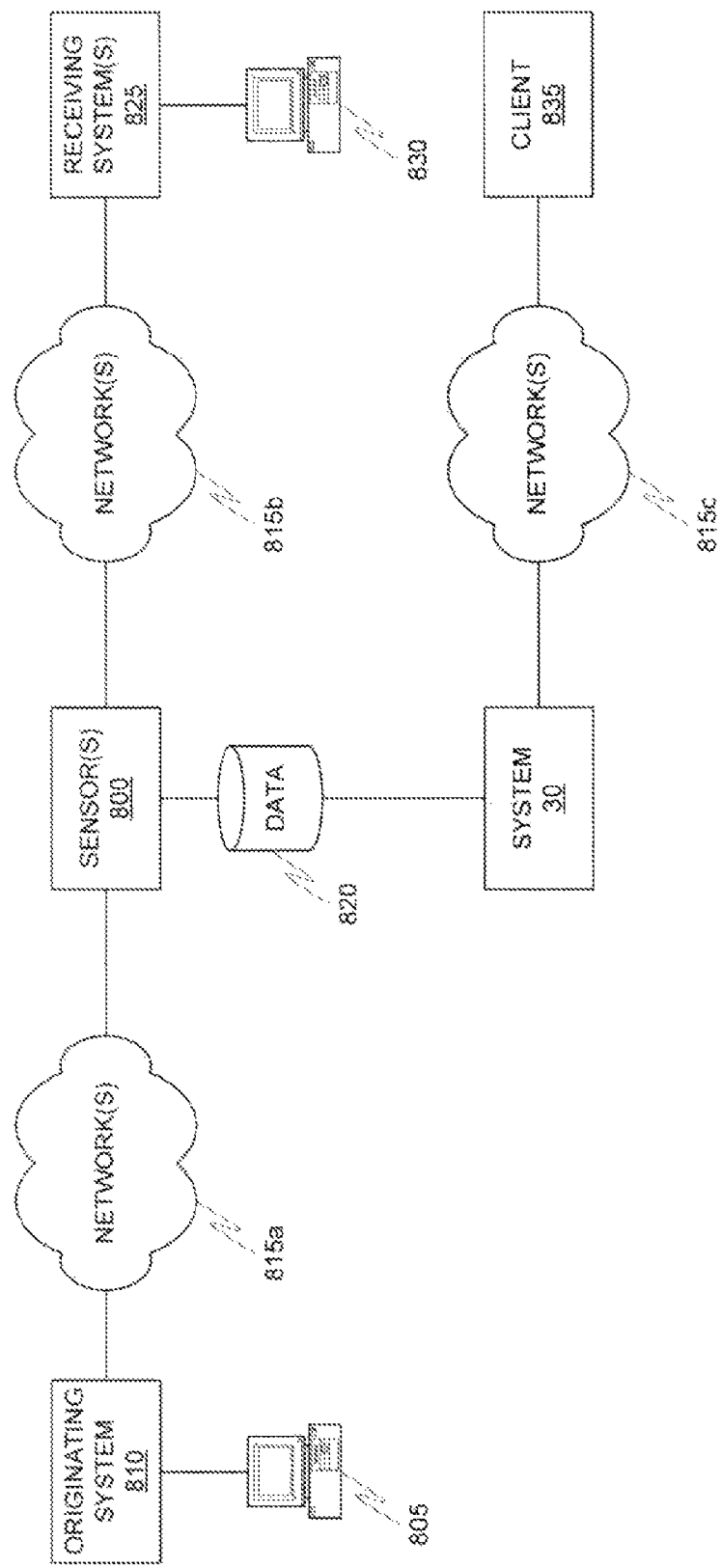
FIG. 13 is a block diagram depicting a message analysis system using an existing network of sensors.

FIG. 13 illustrates that some systems 30 of this disclosure operate using an existing network of sensors 800. In this example the sensors 800 are IronMail servers, publicly available from CipherTrust®, of Alpharetta, Ga. These sensors review mail traveling through associated network elements, such as mail transfer agents, for example. It should be understood that a user 805 creates a message and passes the message to an electronic mail server 810. A network 815a passes the message to a mail transfer agent which is associated with sensor 800. The sensor(s) 800 collects statistics related to messages reviewed and stores them in a database 820. The mail transfer agent forwards the mail to a recipient system 825 associated with a recipient of the message via a network 815b. It should be understood that the networks discussed herein can be the same network, or different subparts to the same network, although it should be understood that this disclosure is not limited to such an environment.

System 30 can examine the data stored by the sensor(s) 800 as described above. The system 30 can also make the data available to a client 835 (e.g., a web browser, and e-mail client, an SMS message, etc.) via a network 815c. In various examples, the client 835 can receive and/or retrieve information about potential spoofing activity. In the web-based example, a user could enter an IP address or domain name to observe the traffic associated with a system. In other examples, the detection system can send a message to a user or domain administrator, for example, via an ISP. Information can also be gathered from off-network areas, purchased from other companies and used for comparison and alert purposes within the system.

It should be further noted that the sensors 800 can gather information that would be useful to a company to determine whether anyone inside their company is transmitting illegitimate messaging traffic. Similarly, traffic patterns collected by the sensors 800 can be used to determine if there is concerted activity on the part of many computers associated with a domain or IP addresses. Such situations are evidence that a computer or network is infected with a virus, worm or spyware causing the computer or network to operate as a zombie client, thereby showing large increases in messaging traffic originating from a domain or IP address. Correlation of large amounts of messaging traffic indicates zombie activity, and helps administrators. Moreover, it can alert a reputation system to discount the messages sent by a domain or IP address during the period the system is influence by a zombie, a worm, or a virus, except where the problem persists (e.g., where the problem is ignored). An example of such a system is RADAR™, publicly available from CipherTrust®, which includes a customizable interface enabling users to configure notifications. CipherTrust also makes this information available via the web at: www.trustedsource.org. RADAR also includes a customizable interface to view messages and instances (indicated by URLs embedded in spoofed messages as well as URLs obtained from sources outside of the network of sensors) that indicate brand abuse—name, domain, website. Furthermore, the customizable interface can be configured in some examples to sort by one or more parameters such as, for example: sender, content, brand, time, location (corporate or geographic), among many others. Moreover, in some examples, data can be displayed in graphs, charts, and/or listed in tables, which enable the user to drill down to see different parts of the data (e.g., email header and/or entire message and content). Data from a geographical user interface (GUI) display can also be packaged for delivery (once or at regular intervals) in a file (which can be stored in any format including, for example: a text file, CSV file, a binary file, etc.). In various examples, views can be customized by user type or vertical type (e.g. an ISP view, or a Law Enforcement view, Banking view).

Figure 14:
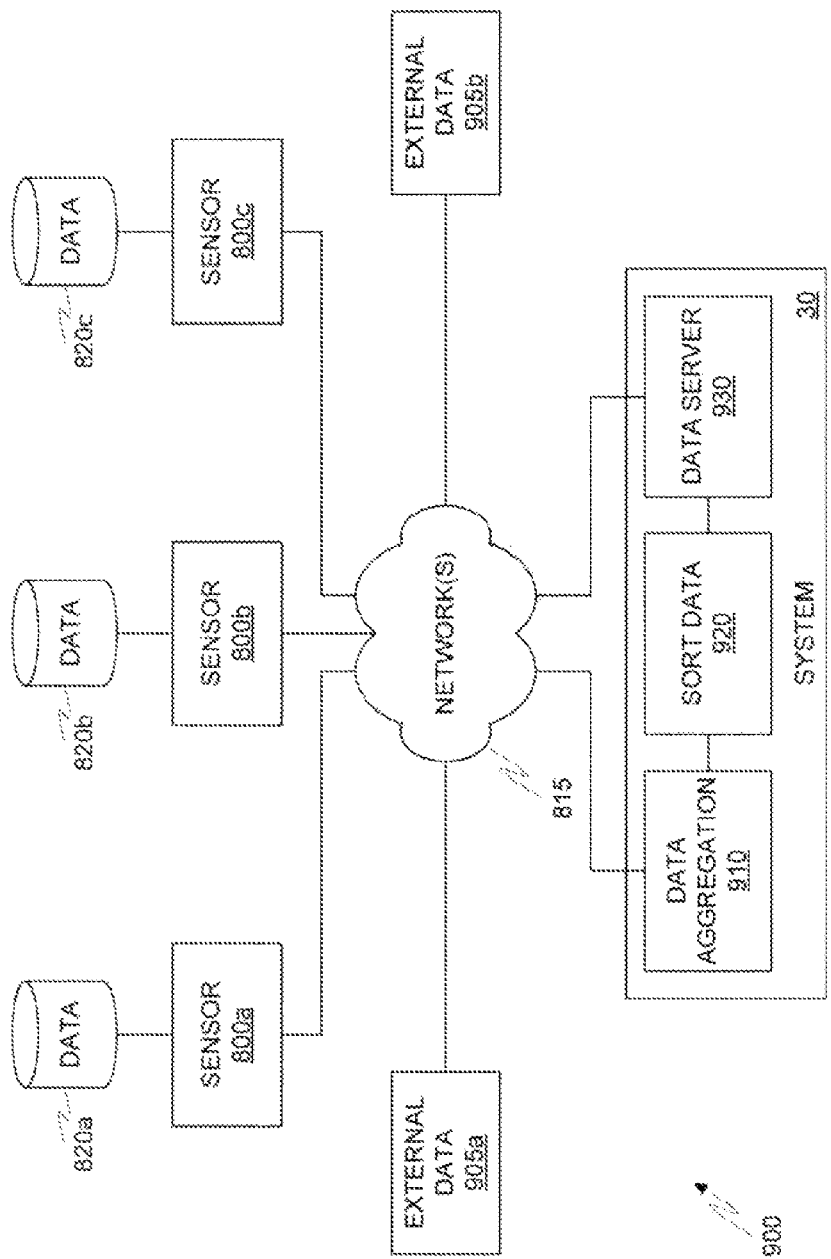
FIG. 14 is a block diagram depicting the aggregation of threat data collected from existing sensors and external sources.

FIG. 14 illustrates an architecture 900 for aggregating data from a plurality of sensors 800a-c and external data received from other types of data collection systems such as data at rest. Data at rest can include, for example, among many others, the data stored on a domain name server or on a web server. It should be understood that each of the sensors 800a-C can include a local data store 820a-c, respectively, in which the sensor can store collected information. This data can be shared with system 30 via network(s) 815.

It should be understood that the stored data from the sensors 800a-c can be automatically sent to system 30, periodically, in times of low traffic or processor usage, or based upon some other triggering mechanism. Alternatively, the stored data from the sensors 800a-c can be automatically retrieved by the system 30, periodically, in times of low traffic or processor usage, or based upon some other triggering mechanism.

Additionally, system 30 can collect external data 905a-b, such as web data, domain name data, or other data at rest via the network(s) 815. The external data 905a-b can be collected by systems outside of the network of sensors. The external data 905a-b can be aggregated with the stored data received from the network of sensors 800a-c, as shown by aggregation block 910. The aggregated data can be sorted and/or analyzed as shown by block 920. The sorted and/or analyzed data can then be shared via the network(s) 815 using data server 930.

It should be understood that the data server can be used to provide the analyzed data to customers and other users via the world wide web, for example. Moreover, it should be noted that the sensors 800a-c can be configured to periodically retrieve the analyzed data from system 30, in order to operate on communication data using the latest threat and/or classification information to the sensors 800a-c.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless that context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for detecting a spoofing situation with respect to one or more electronic communications, the method comprising:
receiving an electronic communication through a network interface addressed to a recipient;
storing the electronic communication in computer memory;
determining, by one or more processors and prior to the communication being provided to the recipient, that the electronic communication includes a link associated with a description of a first entity and that the link links to first content represented as particular content of the first entity, wherein the first content includes a first set of elements;
identifying a legitimate version of the particular content including a second set of elements, wherein identifying the legitimate version includes identifying a first fingerprint of one or more elements from the legitimate version;
generating a second fingerprint, wherein the second fingerprint is a fingerprint of one or more elements from the first content;
determining a degree of match between the first and second sets of elements based at least in part on a comparison of the second fingerprint with the first fingerprint, wherein determining the degree of match includes determining whether one or more elements of the first set of elements originate from a second entity different from the first entity;
detecting, by the one or more processors, prior to the communication being provided to the recipient that a spoofing situation exists with respect to the received electronic communication based upon the determined degree of match; and
in response to detecting that a spoofing situation exists, blocking the communication from being provided to the recipient.

2. The method of claim 1, wherein the spoofing situation is a phishing situation wherein the link to the linked entity is a hyperlink to a website operated by the linked entity.

3. The method of claim 2, wherein the linked entity is an attacker whose website, to which the hyperlink links, is configured for feigning association with the first entity and for acquiring confidential information from a user for illegitimate gain.

4. The method of claim 1, wherein the first and second sets of elements include graphical elements.

5. The method of claim 1, wherein generating the fingerprints includes use of a winnowing fingerprint approach.

6. The method of claim 1, wherein the first and second sets of elements include image elements.

7. The method of claim 1, wherein the degree of match includes a match selected from the group consisting of a complete match, strong match, partial match, totally incomplete match, and combinations thereof.

8. The method of claim 1, further comprising:
storing a number of instances of legitimate and illegitimate usages based upon whether the fingerprint of the first content and the fingerprint of the legitimate version of the particular content match; and
displaying statistics comparing the number of instances of legitimate usage versus the number of instances of illegitimate usages.

9. The method of claim 1, wherein results of said detecting step are provided to a reputation system;
wherein the reputation system uses the provided results as part of its determination of what reputation should be ascribed to a sender of the electronic communication.

10. The method of claim 1, wherein results of said detecting step are provided to a fraud database for correlation and aggregation.

11. The method of claim 1, wherein an action is performed in response to results of said detecting step; and
wherein the action includes shutting down a website associated with the second entity.

12. The method of claim 1, wherein a notification is provided to the first entity of results of said detecting step.

13. The method of claim 1, further comprising:
determining whether a mismatch has occurred with an href attribute in the received electronic communication; and
detecting whether a spoofing situation exists with respect to the received electronic communication based upon the determination with respect to the href attribute mismatch.

14. The method of claim 1, wherein the electronic communication is a communication selected from the group consisting of an e-mail message, and instant message, an SMS communication, a VOIP communication, a WAP communication, and combinations thereof.

15. The method of claim 1, further comprising:
responsive to detecting a spoofing situation exists, performing at least one of the steps comprising changing the reputation of the sender of the communication.

16. The method of claim 1, wherein the step of detecting further comprises:
determining a reputation associated with a URL included in the communication;
determining whether the age of the domain used in the URL is greater than a threshold;
determining whether the owner of the domain/IP hosting a URL included in the communication matches the owner of an IP address associated with the communication; and
determining whether an owner of a phone number associated with the communication matches a database of known spoofing phone numbers.

17. The method of claim 1, wherein the first and second sets of elements include at least one of anchor text or an image.

18. A method of detecting illegitimate traffic originating from a domain, the method comprising:
deploying a plurality of sensor devices at a plurality of associated nodes on the Internet;
gathering messaging information from the plurality of sensor devices, wherein the messaging information describes messages originating from a set of domains including the domain;
correlating a portion of the gathered messaging information for the domain;
determining from the correlation whether a probable security condition exists with regard to the domain, wherein the determining the probable security condition comprises:
comparing legitimate content of the domain with content contained in the gathered messaging information to identify that a volume of messages described in the received messaging information includes content that does not match the legitimate content, wherein the comparing includes:
identifying a first fingerprint of one or more elements from the legitimate content;
generating a second fingerprint, wherein the second fingerprint is a fingerprint of one or more elements from the content contained in the gathered messaging information; and
comparing the second fingerprint with the first fingerprint;
signaling the probable security condition based at least in part on identifying that the volume of messages includes content that does not match the legitimate content; and
alerting an owner or an internet service provider associated with the domain of the probable security condition with regard to the domain.

19. The method of claim 18, wherein the determining step comprises:
comparing a list of company URLs contained in the gathered messaging information with an inventory of permitted URLs based upon one or more IP addresses associated with a particular entity associated with the domain; and
if the list of company URLs contained in the received messaging information do not match the inventory of permitted URLs, signaling the probable security condition.

20. The method of claim 18, wherein the determining step comprises:
comparing message traffic levels of multiple machines associated with the same domain, the messaging traffic levels being based on a messaging traffic level of messages from the domain; and
if the message traffic levels of multiple machines associated with the same domain display similar peak or similarly sporadic traffic levels during similar time periods, signaling the probable security condition.

21. The method of claim 18, wherein the sensor devices collect information about messaging traffic which travels across the associated nodes without regard to the origin or destination of the messaging traffic.

22. The method of claim 21, wherein the sensor devices collect information about all messaging traffic which travels across the associated nodes without regard to a protocol associated with the messaging traffic.

23. A method of detecting illegitimate traffic originating from a domain, the method comprising:
deploying a plurality of sensor devices at a plurality of associated nodes on the Internet;
gathering messaging information from the plurality of sensor devices, wherein the messaging information describes messages originating from a set of IP addresses including a particular IP address;
correlating a portion of the gathered messaging information for the particular IP address;
identifying a particular entity associated with the particular IP address;
determining from the correlation whether a probable security condition exists with regard to the particular IP address, wherein the determining step comprises:
comparing legitimate content of the particular entity with content contained in the gathered messaging information to identify that a volume of messages described in the received messaging information includes content that does not match the legitimate content, wherein the comparing includes:
identifying a first fingerprint of one or more elements from the legitimate content;
generating a second fingerprint, wherein the second fingerprint is a fingerprint of one or more elements from the content contained in the gathered messaging information; and
comparing the second fingerprint with the first fingerprint;
signaling the probable security condition based at least in part on identifying that the volume of messages includes content that does not match the legitimate content; and
alerting an owner associated with the particular IP address or an internet service provider associated with the IP address of the probable security condition with regard to the particular IP address.

* * * * *